(12) United States Patent
Kano et al.

(10) Patent No.: US 7,079,933 B2
(45) Date of Patent: Jul. 18, 2006

(54) AUTOMATIC CLUTCH CONTROL DEVICE

(75) Inventors: Hiroyuki Kano, Nagoya (JP); Masaki Kinoshita, Kariya (JP); Hiroaki Endo, Shizuoka-ken (JP); Taro Hirose, Susono (JP)

(73) Assignees: Advics Co., Ltd., Kariya (JP); Toyota Jidosha Kabushiki Kaisha, Toyota (JP)

( * ) Notice: Subject to any disclaimer, the term of this patent is extended or adjusted under 35 U.S.C. 154(b) by 273 days.

(21) Appl. No.: 10/690,666

(22) Filed: Oct. 23, 2003

(65) Prior Publication Data

US 2004/0138024 A1   Jul. 15, 2004

(30) Foreign Application Priority Data

Oct. 25, 2002   (JP)   ............... 2002-310640

(51) Int. Cl.
*G06F 7/00*  (2006.01)
*G06F 17/00* (2006.01)
*G06F 19/00* (2006.01)

(52) U.S. Cl. ............... 701/67; 701/1; 701/68

(58) Field of Classification Search .......... 701/51, 701/67, 70, 36, 41, 1, 68; 477/7, 8, 39, 80, 477/180, 155; 192/3, 103 R; G06F 7/00
See application file for complete search history.

(56) References Cited

U.S. PATENT DOCUMENTS

| | | | | |
|---|---|---|---|---|
| 3,898,893 A | * | 8/1975 | Hashimoto et al. ........... 477/15 |
| 4,503,734 A | * | 3/1985 | Acker ......................... 701/67 |
| 4,618,043 A | * | 10/1986 | Hattori et al. ................ 477/85 |
| 4,632,231 A | * | 12/1986 | Hattori et al. ............... 477/175 |
| 4,720,790 A | * | 1/1988 | Miki et al. .................... 701/41 |
| 4,732,055 A | | 3/1988 | Tateno et al. |
| 4,732,246 A | | 3/1988 | Tateno et al. |
| 4,778,038 A | * | 10/1988 | Ohkawa et al. ............... 477/74 |
| 4,831,894 A | * | 5/1989 | Braun ......................... 74/745 |
| 4,899,279 A | | 2/1990 | Cote et al. |
| 4,899,857 A | | 2/1990 | Tateno et al. |
| 5,277,286 A | * | 1/1994 | Yamamoto et al. ...... 192/103 C |
| 5,403,249 A | * | 4/1995 | Slicker ....................... 477/176 |
| 5,439,428 A | * | 8/1995 | Slicker ....................... 477/175 |
| 5,487,272 A | * | 1/1996 | Nagao ............................. 62/6 |
| 5,502,639 A | * | 3/1996 | Fukunaga et al. ............. 701/41 |

(Continued)

FOREIGN PATENT DOCUMENTS

JP   60-241553 A   11/1985

(Continued)

*Primary Examiner*—Cuong Nguyen
(74) *Attorney, Agent, or Firm*—Buchanan Ingersoll PC

(57) ABSTRACT

This automatic clutch control device selects a normal mode when a road friction coefficient is not less than 0.3 at a disconnecting operation starting point (time t1), selects a little low-speed mode when it is not less than 0.1 but less than 0.3 and selects a low-speed mode when it is less than 0.1. Further, when a vehicle stabilizing control such as a traction control or the like is not executed at the time t1, this device selects the normal mode, while when a vehicle stabilizing control is executed at the time t1, it selects the low-speed mode. Moreover, this device selects a high-speed mode when the vehicle is in a sports running mode at the time t1, while selects the normal mode when the vehicle is not in the sports running mode. A connecting operation of a clutch is performed with a speed corresponding to the selected mode in an automatic clutch connecting/disconnecting control by a clutch connecting/disconnecting actuator upon executing a gear-shift control.

11 Claims, 15 Drawing Sheets

U.S. PATENT DOCUMENTS

| | | | |
|---|---|---|---|
| 5,590,563 A * | 1/1997 | Kuwahata et al. | 74/337.5 |
| 5,634,867 A | 6/1997 | Mack | |
| 5,954,176 A * | 9/1999 | Ishihara et al. | 192/83 |
| 6,033,341 A * | 3/2000 | Yamamoto et al. | 477/181 |
| 6,351,700 B1 * | 2/2002 | Muramoto et al. | 701/51 |
| 6,602,161 B1 * | 8/2003 | Hemmingsen et al. | 477/79 |
| 6,708,088 B1 * | 3/2004 | Matsuno et al. | 701/1 |
| 6,769,526 B1 * | 8/2004 | Iida et al. | 192/82 T |
| 6,898,504 B1 * | 5/2005 | Kadota | 701/67 |
| 2004/0140174 A1 | 7/2004 | Kano et al. | |

FOREIGN PATENT DOCUMENTS

| | | |
|---|---|---|
| JP | 6-272761 A | 9/1994 |
| JP | 9-42443 A | 2/1997 |
| JP | 11-36912 A | 2/1999 |
| JP | 2000-88009 A | 3/2000 |
| JP | 2002-122163 A | 4/2002 |

* cited by examiner

AUTOMATIC CLUTCH CONTROL DEVICE

BACKGROUND OF THE INVENTION

1. Field of the Invention

The present invention relates to an automatic clutch control device that automatically connects/disconnects a clutch disposed between an output shaft of a power source of a vehicle and an input shaft of a transmission of the vehicle, when a shift operation is performed by the transmission.

2. Description of the Prior Arts

There has conventionally been known an automatic clutch control device provided with a clutch connecting/disconnecting actuator for driving a clutch, disposed between an output shaft of a power source of a vehicle and an input shaft of a transmission, so as to be connected and disconnected, wherein, not by an operation of a clutch pedal by a driver but by the clutch connecting/disconnecting actuator, a disconnecting operation for changing the state of the clutch from a connecting state to a disconnecting state is executed before the transmission starts the shift operation and a connecting operation for changing the state of the clutch from the disconnecting state to the connecting state is executed after the shift operation is completed (for example, see the following patent documents 1 and 2).

[Patent Document 1]

Japanese Unexamined Patent Application No. SHO60-44641

[Patent Document 1]

Japanese Unexamined Patent Application No. HEI9-79374

However, the above-mentioned patent documents 1 and 2 that disclose a conventional device of this type do not teach a method for setting/changing a speed of the connecting operation or a speed of the disconnecting operation executed by the clutch connecting/disconnecting actuator, whereby the conventional device has a problem that, even if there is a request for changing the speed of the connecting operation or the speed of the disconnecting operation of the clutch according to the running state of a vehicle such as a road condition on which the vehicle runs, the speed of the connecting operation and the speed of the disconnecting operation cannot suitably be changed in accordance with the request.

Therefore, an object of the present invention is to provide an automatic clutch control device capable of suitably changing a speed of a connecting operation or a speed of a disconnecting operation in accordance with a running state of a vehicle.

SUMMARY OF THE INVENTION

A feature of the present invention is an automatic clutch control device comprising a clutch connecting/disconnecting actuator for driving a clutch, disposed between an output shaft of a power source of a vehicle and an input shaft of a transmission, so as to be connected or disconnected, and clutch control means that executes a disconnecting operation for changing the state of the clutch from a connecting state to a disconnecting state before the transmission starts the shift operation and executes a connecting operation for changing the state of the clutch from the disconnecting state to the connecting state after the shift operation is completed, wherein the clutch control means changes at least one of a speed of the connecting operation and a speed of the disconnecting operation in accordance with a running state of the vehicle.

The "transmission" here is a manual transmission wherein the shift operation is carried out by an operation of a shift lever by a driver (including the one in which the shift operation is directly executed by the operation of the shift lever by the driver and the one in which the shift operation is executed by an actuator for a gear shift based upon a signal indicating the position of the shift lever operated by the driver), or an automatic transmission wherein the shift operation is automatically carried out according to a running state of the vehicle, not by the operation of the shift lever by the driver.

Further, the "connecting operation speed" and "disconnecting operation speed" are, for example, are a rate of change of air pressure or oil pressure in case where the clutch connecting/disconnecting actuator utilizes air pressure or oil pressure, a travelling speed of a specific component in the clutch moved by the air pressure or the oil pressure, a rate of change of press-contact force on a frictional face of a clutch disc in the clutch, or the like, but not limited to these. Moreover, the "clutch" here does not include the one disposed in the transmission for executing the shift operation.

In this case, the automatic clutch control device may comprise road friction coefficient obtaining means for obtaining a road friction coefficient that is a friction coefficient between the road surface on which the vehicle runs and a tire of the vehicle, wherein the clutch control means is preferably configured to change at least one of the connecting operation speed and the disconnecting operation speed in accordance with the road friction coefficient, and further, wherein the clutch control means is more preferably configured to slow at least one of the connecting operation speed and the disconnecting operation speed as the road friction coefficient is smaller.

During when the clutch is in the disconnecting state, in general, driving force is not exerted on driving wheels, so that the vehicle is brought into a state where it cannot accelerate and is likely to be unstable. Therefore, it is required to shorten the period when the clutch is in the disconnecting state upon the shift by the transmission. Accordingly, it is also required to increase the disconnecting operation speed and the connecting operation speed executed by the clutch connecting/disconnecting actuator.

During when the connecting operation and disconnecting operation are executed (i.e., the clutch is in a half-clutch state), a driving torque (including a deceleration torque by an engine brake) exerted on the driving wheels is changed. The rage of change of the driving torque increases in accordance with the increase in the disconnecting operation speed and the connecting operation speed, while decreases in accordance with the decrease in the disconnecting operation speed and the connecting operation speed. Therefore, when the disconnecting operation speed and the connecting operation speed are excessively fast, the rate of change of the driving torque exerted on the driving wheels becomes also excessive, thereby being likely to cause a slip of the driving wheel. From the above, the disconnecting operation speed and the connecting operation speed are set to a constant value that is a predetermined fast value not causing a slip of the driving wheels on a normal road.

However, on the other hand, the slip of the driving wheel tends to be likely to occur as the road friction coefficient becomes small. Therefore, when the disconnecting operation speed and the connecting operation speed are set to the predetermined fast constant value irrespective of the magnitude of the road friction coefficient, there may be the case where the slip of the driving wheel is likely to occur, so that the vehicle becomes unstable.

On the other hand, the configuration wherein at least one of the connecting operation speed and the disconnecting operation speed is changed in accordance with the road friction coefficient can set, for example, the connecting operation speed to the predetermined fast speed when the road friction coefficient is great, while set the same so as to become slow in accordance with the decrease in the road friction coefficient. As a result, the period when the clutch is in the disconnecting state is shortened when the road friction coefficient is great, while the slip (in the accelerating direction) of the driving wheel hardly occurs when the road friction coefficient is small, whereby a vehicle stability can satisfactorily be maintained regardless of the magnitude of the road friction coefficient.

Moreover, in case where the vehicle, to which the automatic clutch control device is applied, comprises vehicle stabilizing control executing means for setting a target wheel speed related amount of each wheel in accordance with a running state of the vehicle and controlling braking force exerted on each wheel such that an actual wheel speed related amount of each wheel becomes the target wheel speed related amount, the clutch control means is preferably configured to change at least one of the connecting operation speed and the disconnecting operation speed depending upon whether the vehicle stabilizing control is executed or not, and further, the clutch control means is more preferably configured to slow at least one of the connecting operation speed and the disconnecting operation speed when the vehicle stabilizing control is executed, compared to the case where the vehicle stabilizing control is not executed.

The "vehicle stabilizing control" here is, for example, a so-called ABS control, so-called traction control, so-called oversteer and understeer suppressing control or the like. Further, the "wheel speed related amount" is, for example, a wheel speed, slip ratio (e.g., a ratio of a value obtained by subtracting a vehicle body speed from a wheel speed to the vehicle body speed), and a slip amount (e.g., a value obtained by subtracting the vehicle body speed from the wheel speed), but not limited thereto.

In case where the vehicle stabilizing control is executed for controlling the braking force exerted on each wheel such that an actual wheel speed related amount of each wheel becomes the target wheel speed related amount, when the rate of change of the driving torque (including a deceleration torque by an engine brake) exerted on the driving wheel increases, there may be a possibility that the vehicle stabilizing control is difficult to be precisely executed because the change of the driving torque becomes a great disturbance.

Accordingly, when the disconnecting operation speed and the connecting operation speed are set to a fast value (e.g., the aforesaid predetermined fast constant value) in case where the shift operation is performed by the transmission during when the vehicle stabilizing control is executed, there may be a possibility that the vehicle stabilizing control is difficult to be precisely executed.

On the other hand, the configuration for changing at least one of the connecting operation speed and the disconnecting operation speed depending upon whether the vehicle stabilizing control is executed or not as described above can set, for example, the connecting operation speed so as to be slowed down when the vehicle stabilizing control is executed, compared to the case where the vehicle stabilizing control is not executed. As a result, even if the shift operation is carried out by the transmission during when the vehicle stabilizing control is executed, the vehicle stabilizing control is precisely executed and the vehicle stability can satisfactorily be maintained.

Further, the automatic clutch control device has determining means that determines whether a predetermined operation for obtaining an acceleration greater than an acceleration obtained when the vehicle is in the normal running state is executed or not by a driver, wherein the clutch control device is preferably configured to change at least one of the connecting operation speed and the disconnecting operation speed depending upon whether the predetermined operation is executed or not, and further, the clutch control device is more preferably configured to increase at least one of the connecting operation speed and the disconnecting operation speed when the predetermined operation is executed, compared to the case where the predetermined operation is not executed.

Here, the "predetermined operation" is, for example, an operation on an accelerator pedal such that the operating amount of the accelerator pedal continuously becomes greater than a predetermined great value over a predetermined period, or in case where the vehicle to which the automatic clutch control device is applied has selecting means (e.g., a sports running mode selecting switch) for selecting a normal running mode and a sports running mode in which a timing of shift-up of the gear in the transmission is moved to the high-speed rotation side so as to obtain an acceleration greater than that in the normal running mode, the "predetermined operation" is an operation for selecting the sports running mode by the selecting means, but it is not limited thereto.

The execution of the predetermined operation by the driver means that there is a demand by the driver that he or she wants to get an acceleration greater than that obtained in the case of the normal running state of the vehicle. In this case, shortening the period when the driving force cannot be exerted on the driving wheel due to the clutch that is brought into the disconnecting state meets the demand of the driver.

Accordingly, the configuration for changing at least one of the connecting operation speed and the disconnecting operation speed depending upon whether the predetermined operation is executed or not as described above can set, for example, the connecting operation speed so as to be increased when the predetermined operation is executed, compared to the case where the predetermined operation is not executed. As a result, when the predetermined operation is executed by the driver, the period when the clutch is in the disconnecting state with the shift operation by the transmission can be shortened, whereby the vehicle can be returned again to the accelerating state from an earlier stage. Therefore, the control that meets the demand of the driver can be executed.

BRIEF DESCRIPTION OF THE DRAWINGS

FIG. 8 is a flowchart showing a routine, executed by a CPU shown in FIG. 1, for calculating a wheel speed or the like;

DESCRIPTION OF THE PREFERRED EMBODIMENT

Figure 1:
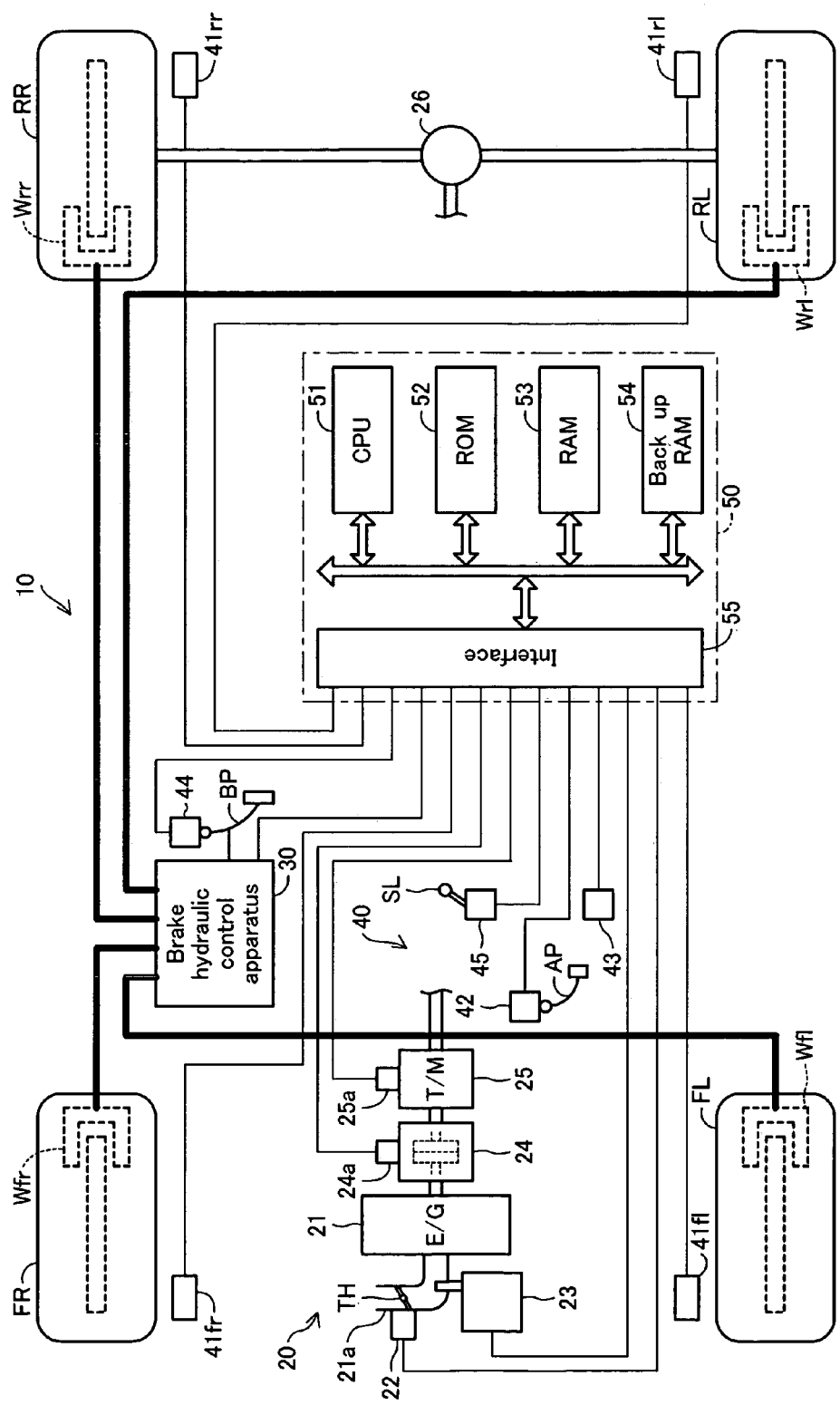
FIG. 1 is a schematic constructional view of a vehicle provided with an automatic clutch control device for a vehicle according to an embodiment of the present invention.

A preferred embodiment of an automatic clutch control device for a vehicle according to the present invention will be explained hereinbelow with reference to drawings. FIG. 1 shows a schematic construction of a vehicle provided with a control device 10 for a vehicle including an automatic clutch control device according to the embodiment of the invention. This vehicle is a four-wheel drive vehicle using a rear-wheel drive system and having two front wheels (front-left wheel FL and front-right wheel FR) that are non-driving wheels and two rear wheels (rear-left wheel RL and read-right wheel RR) that are driving wheels.

The control device 10 for the vehicle is configured to include a driving force transmission section 20 that produces driving force and respectively transmits this driving force to each driving wheel RL and RR, a brake hydraulic control apparatus 30 for producing braking force by a brake fluid pressure on each wheel, a sensor section 40 composed of various sensors and an electrical control apparatus 50.

The driving force transmission section 20 is configured to include an engine 21 as a power source that produces driving force, a throttle valve actuator 22 arranged in an inlet pipe 21a of the engine 21 and having a DC motor for controlling an opening of a throttle valve TH that can modulate the cross-sectional area of the inlet path, a fuel injection device 23 including an injector that injects fuel to the vicinity of an inlet port not shown of the engine 21, a clutch 24 whose input shaft is connected to an output shaft of the engine 21, a transmission 25 whose input shaft is connected to the output shaft of the clutch and a differential gear 26 that suitably distributes and transmits driving force transmitted from the output shaft of the transmission 25 to rear wheels RR and RL.

The clutch 24 is a friction clutch that transmits power from the engine 21 to the transmission 25 by frictional force, according to press-contact force F, produced by exerting the press-contact force F based upon urging force F1 of a clutch spring not shown on a frictional face of a clutch disc. This press-contact force F can be adjusted by a clutch connecting/disconnecting actuator 24a operated by oil pressure that is produced by utilizing a hydraulic circuit not shown.

More specifically, the clutch connecting/disconnecting actuator 24a is configured to produce driving force for decreasing the press-contact force F exerted on the frictional face of the clutch disc. Accordingly, the press-contact force F has the maximum value F1 that is equal to the urging force F1 of the clutch spring in a state where the clutch connecting/disconnecting actuator 24a does not generate the driving force. In this case, the clutch 24 is brought into a perfect connecting state (hereinafter referred to as a "perfect connecting state") wherein a slip does not occur on the frictional face of the clutch disc and all power from the engine 21 is transmitted to the transmission 25.

Further, the press-contact force F decreases as the driving force of the clutch connecting/disconnecting actuator 24a increases. In a state where the press-contact force is not less than "0" but smaller than the maximum value F1, the clutch 24 is brought into a half-connecting state (hereinafter referred to as "half-clutch state") wherein a slip can be generated on the frictional face of the clutch disc and a part of the power from the engine 21 can be transmitted to the transmission 25.

When the driving force from the clutch connecting/disconnecting actuator 24a becomes not less than a predetermined value, the press-contact force F becomes "0". In this case, the clutch 24 is brought into a perfect disconnecting state (hereinafter referred to as a "perfect disconnecting state") wherein the power from the engine 21 cannot be transmitted to the transmission 25.

Further, when the clutch 24 is in the perfect connecting state, the clutch connecting/disconnecting actuator 24a outputs a signal for indicating that the clutch 24 is in the perfect connecting state, and when the clutch 24 is in the perfect disconnecting state, the clutch connecting/disconnecting actuator 24a outputs a signal for indicating that the clutch 24 is in the perfect disconnecting state. In this way, the state of the clutch 24 can be changed by adjusting the driving force from the clutch connecting/disconnecting actuator 24a, not by an operation of a clutch pedal by a driver.

The transmission 25 has plural (for example, seven stages) forward gear stages for travelling forward, reverse gear stage for travelling backward and neutral gear stage. A combination of internal plural trains of gear is changed by a gear-shift actuator 25*a* operated by oil pressure that is generated by utilizing the hydraulic circuit not shown, whereby any one of the above-mentioned stages is selected. Further, when the gear-shift operation is completed, the gear-shift actuator 25*a* outputs a signal for indicating that the gear-shift operation is completed.

Figure 2:
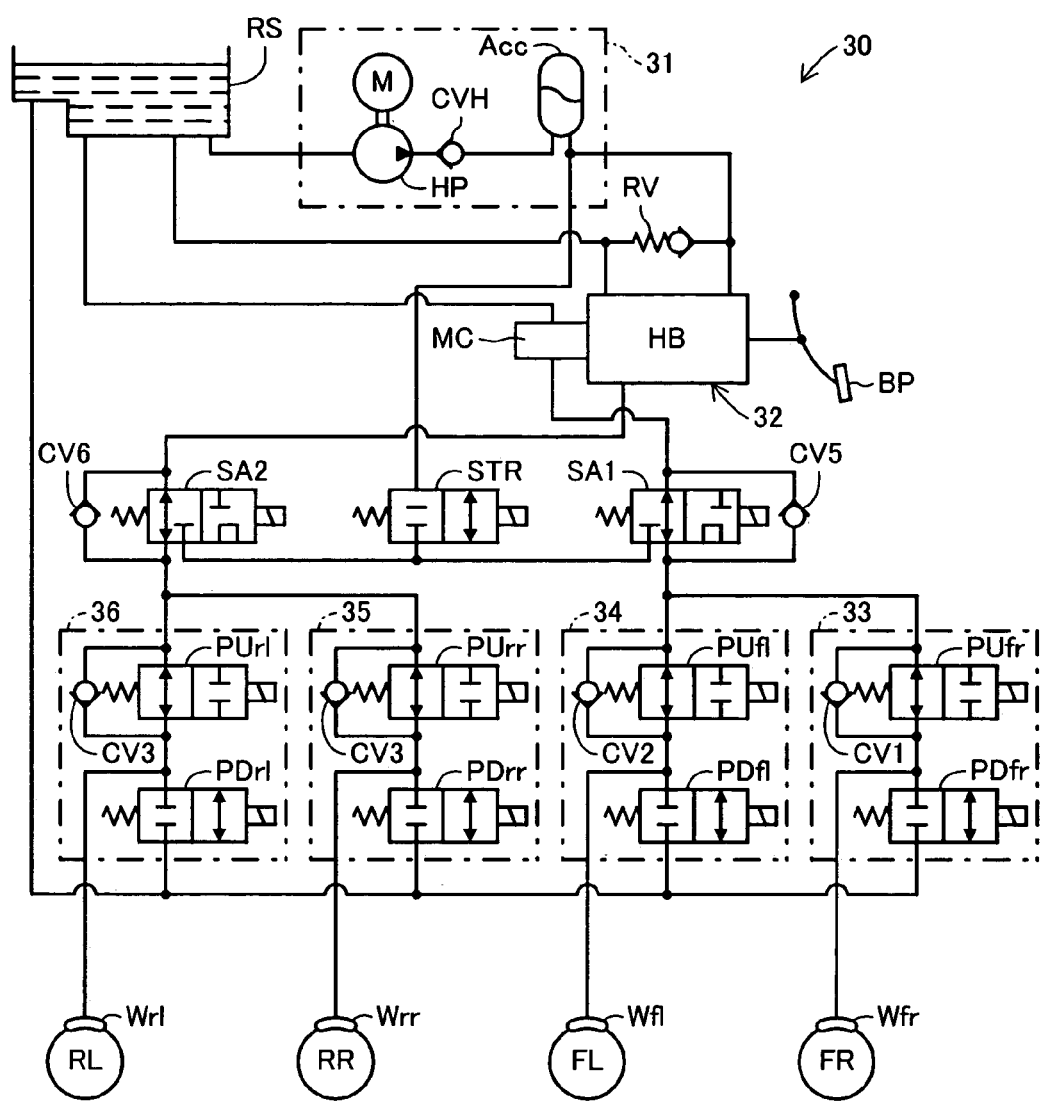
FIG. 2 is a schematic constructional view of a brake hydraulic control apparatus shown in FIG. 1.

The brake hydraulic control apparatus 30 whose construction is schematically shown in FIG. 2 is configured to include a high-pressure generating section 31, a brake fluid pressure generating section 32 that generates brake fluid pressure according to operating force on a brake pedal BP, and an FR brake fluid pressure adjusting section 33, an FL brake fluid pressure adjusting section 34, an RR brake fluid pressure adjusting section 35 and an RL brake fluid pressure adjusting section 36 that are capable of adjusting brake fluid pressure supplied respectively to wheel cylinders Wfr, Wfl, Wrr and Wrl each arranged at each wheel FR, FL, RR and RL.

The high-pressure generating section 31 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 31.

The brake hydraulic generating section 32 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 31 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 33 and the upstream side of the FL brake fluid pressure adjusting section 34. Similarly, a control valve SA2 that is a three-port two-position switching type solenoid-operated valve is arranged between the hydraulic booster HB and each of the upstream side of the RR brake fluid pressure adjusting section 35 and the upstream side of the RL brake fluid pressure adjusting section 36. Further, a change-over valve STR that is a two-port two-position switching type, normally closed, solenoid-operated on-off valve is arranged between the high-pressure generating section 31 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 33 and the upstream section of the FL brake fluid pressure adjusting section 34. When in the second position (in the actuated position), it functions to cut off the communication between the master cylinder MC and each of the upstream section of the FR brake fluid pressure adjusting section 33 and the upstream section of the FL brake fluid pressure adjusting section 34, but establish the communication between the change-over valve STR and each of the upstream section of the FR brake fluid pressure adjusting section 33 and the upstream section of the FL brake fluid pressure adjusting section 34.

When the control valve SA2 is in the first position in FIG. 2 (in the non-actuated position), it functions to establish communication between the hydraulic booster HB and each of the upstream section of the RR brake fluid pressure adjusting section 35 and the upstream section of the RL brake fluid pressure adjusting section 36. When in the second position (in the actuated position), it functions to cut off the communication between the hydraulic booster HB and each of the upstream section of the RR brake fluid pressure adjusting section 35 and the upstream section of the RL brake fluid pressure adjusting section 36, but establish the communication between the change-over valve STR and each of the upstream section of the RR brake fluid pressure adjusting section 35 and the upstream section of the RL brake fluid pressure adjusting section 36.

By this operation, master cylinder fluid pressure is supplied to each of the upstream section of the FR brake fluid pressure adjusting section 33 and the upstream section of the FL brake fluid pressure adjusting section 34 when the control valve SA1 is placed at the first position, while high pressure generated from the high-pressure generating section 31 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 35 and the upstream section of the RL brake fluid pressure adjusting section 36 when the control valve SA2 is placed at the first position, while high pressure generated from the high-pressure generating section 31 is supplied thereto when the control valve SA2 is placed at the second position and the change-over valve STR is placed at the second position.

The FR brake fluid pressure adjusting section 33 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 33 and the wheel cylinder Wfr, while it cuts off the communication between the upstream section of the FR brake fluid pressure adjusting section 33 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 33 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 33. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 33. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 34, RR brake fluid pressure adjusting section 35 and RL brake fluid pressure adjusting section 36 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 33 and the FL brake fluid pressure adjusting section 34 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 30 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 30 can increase only the brake fluid pressure in the wheel cylinder Wfr by a predetermined value by utilizing the high pressure generated from the high-pressure generating section 31 while the brake fluid pressure in the wheel cylinder Wfl is maintained under a state where the brake pedal BP is not operated (is released). As described above, the brake hydraulic control apparatus 30 independently controls the brake fluid pressure in the wheel cylinder of each wheel regardless of the operation on the brake pedal BP, thereby being capable of exerting predetermined braking force on every independent wheel.

Referring again to FIG. 1, the sensor section 40 is composed of wheel speed sensors 41$fl$, 41$fr$, 41$rl$ and 41$rr$ each constructed by a rotary encoder that outputs a signal having a pulse every time each wheel FL, FR, RL and RR rotates at a predetermined angle, an accelerator opening sensor 42 that detects an operating amount of an accelerator pedal AP operated by a driver and outputs a signal showing the operating amount Accp of the accelerator pedal AP, a lateral acceleration sensor 43 that detects a lateral acceleration which is a component in the side direction of a vehicle body of the acceleration actually exerted on the vehicle and outputs a signal showing a lateral acceleration Gy, a brake switch 44 that detects whether the brake pedal BP is operated or not by the driver for outputting a signal showing that the braking operation is performed or not and a shift position sensor 45 that detects the position of a shift lever SL operated by the driver for outputting a signal showing the position of the shift lever SL.

Figure 3:
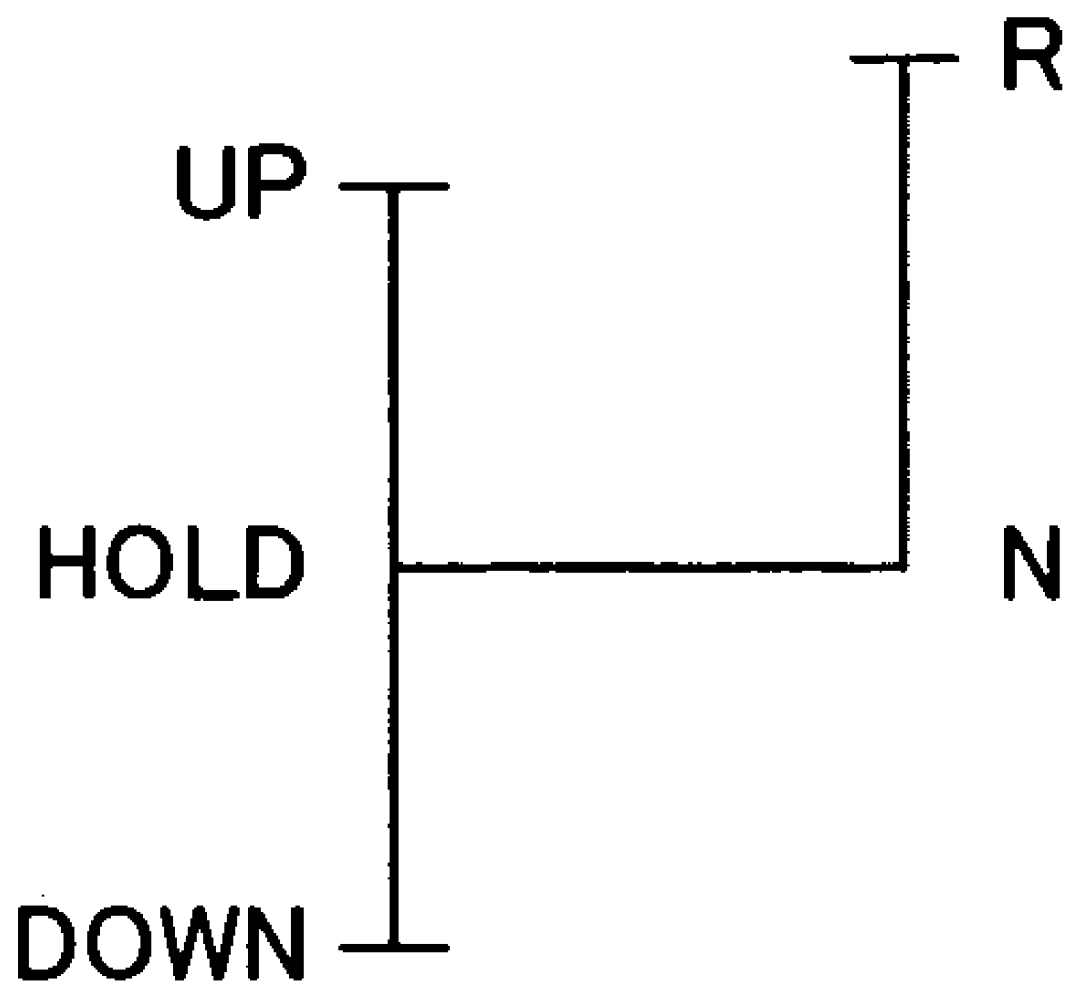
FIG. 3 is a view showing a shift pattern of a shift lever shown in FIG. 1.

As shown in FIG. 3, the shift lever SL can be moved to an N (neutral) position, R (reverse) position, HOLD (hold) position, UP (up) position and DOWN (down) position, and it is held at any one of the N position, R position and HOLD position so long as external force such as control force or the like by the driver is not exerted when it is at the aforesaid any one of the positions. Further, when the shift lever SL is at the UP position or DOWN position, restoring force to the HOLD position is exerted on the shift lever SL, so that the shift lever SL moved to the UP position or DOWN position by the external force such as the control force or the like by the driver is automatically returned to the HOLD position when the external force is not exerted thereon.

The shift position sensor 45 outputs a signal (hereinafter referred to as "N signal") for bringing the transmission 25 into a state where the neutral gear stage is selected, when the shift lever SL is moved to the N position, while it outputs a signal (hereinafter referred to as "R signal") for bringing the transmission 25 into a state where the reverse gear stage is selected, when the shift lever SL is moved to the R position. Moreover, the shift position sensor 45 outputs a signal (hereinafter referred to as "HOLD signal") for maintaining the transmission 25 into a state at present where the forward gear stage is selected, when the shift lever SL is moved to the HOLD position.

Further, the shift position sensor 45 outputs a signal (hereinafter referred to as "UP signal") for bringing the transmission 25 into a state where the forward gear that is the next gear of the forward gear at present toward the high-speed side is selected, when the shift lever SL is moved to the UP position, while it outputs a signal (hereinafter referred to as "DOWN signal") for bringing the transmission 25 into a state where the forward gear that is the next gear of the forward gear at present toward the low-speed side is selected, when the shift lever SL is moved to the DOWN position.

The electrical control apparatus 50 is a microcomputer including a CPU 51, a ROM 52 that stores in advance a routine (program) executed by the CPU 51, table (look-up table, map), constant or the like, a RAM 53 to which the CPU 51 temporarily stores data as needed, a back-up RAM 54 that stores data with a power supply turned on and holds the stored data even during a period when the power supply is turned off and an interface 55 including an AD converter, those of which are connected to one another with a bus.

The interface 55 is connected to the clutch connecting/disconnecting actuator 24a, gear shift actuator 25a, brake hydraulic control apparatus 30 and the sensors 41 to 45, thereby supplying to the CPU 51 signals from the sensors 41 to 45 and transmitting a driving signal to the throttle valve actuator 22, the fuel injection device 23, clutch connecting/disconnecting actuator 24a, gear shift actuator 25a and each solenoid-operated valve and motor M of the brake hydraulic control apparatus 30 according to the instruction from the CPU 51.

By this operation, the throttle valve actuator 22 drives the throttle valve TH so as to obtain an opening thereof according to the operating amount Accp of the accelerator pedal AP, and the fuel injection device 23 injects fuel in a required amount so as to obtain a predetermined target air-fuel ratio (theoretical air-fuel ratio) concerning intake air mass according to the opening of the throttle valve TH. Further, the gear shift actuator 25a selects the stage of the transmission 25 based upon the output from the shift position sensor 45.

[Outline of Clutch Connecting/Disconnecting Control and Gear-shift Control of the Present Invention]

The control device 10 (simply referred sometimes to as "this device" hereinbelow) for a vehicle including the automatic clutch control device according to the present invention controls the driving force of the clutch connecting/disconnecting actuator 24a for driving the clutch 24 so as to be connected or disconnected, in order to perform a gear-shift operation (shift operation of the transmission) for changing the forward gear stage of the transmission 25 when the shift lever SL is operated by the driver and the above-mentioned UP signal or DOWN signal is outputted from the shift position sensor 45.

When the above-mentioned N signal, R signal and HOLD signal are outputted from the shift position sensor 45, when a vehicle is stopped, when the vehicle starts to move, or when the vehicle runs at very low speed, this device controls the clutch 24 based upon a well-known technique according to need, but in the present specification, the detailed explanation of the control of the clutch 24 in these cases is omitted.

[Basic Clutch Connecting/Disconnecting Control and Gear-shift Control]

Figure 4:
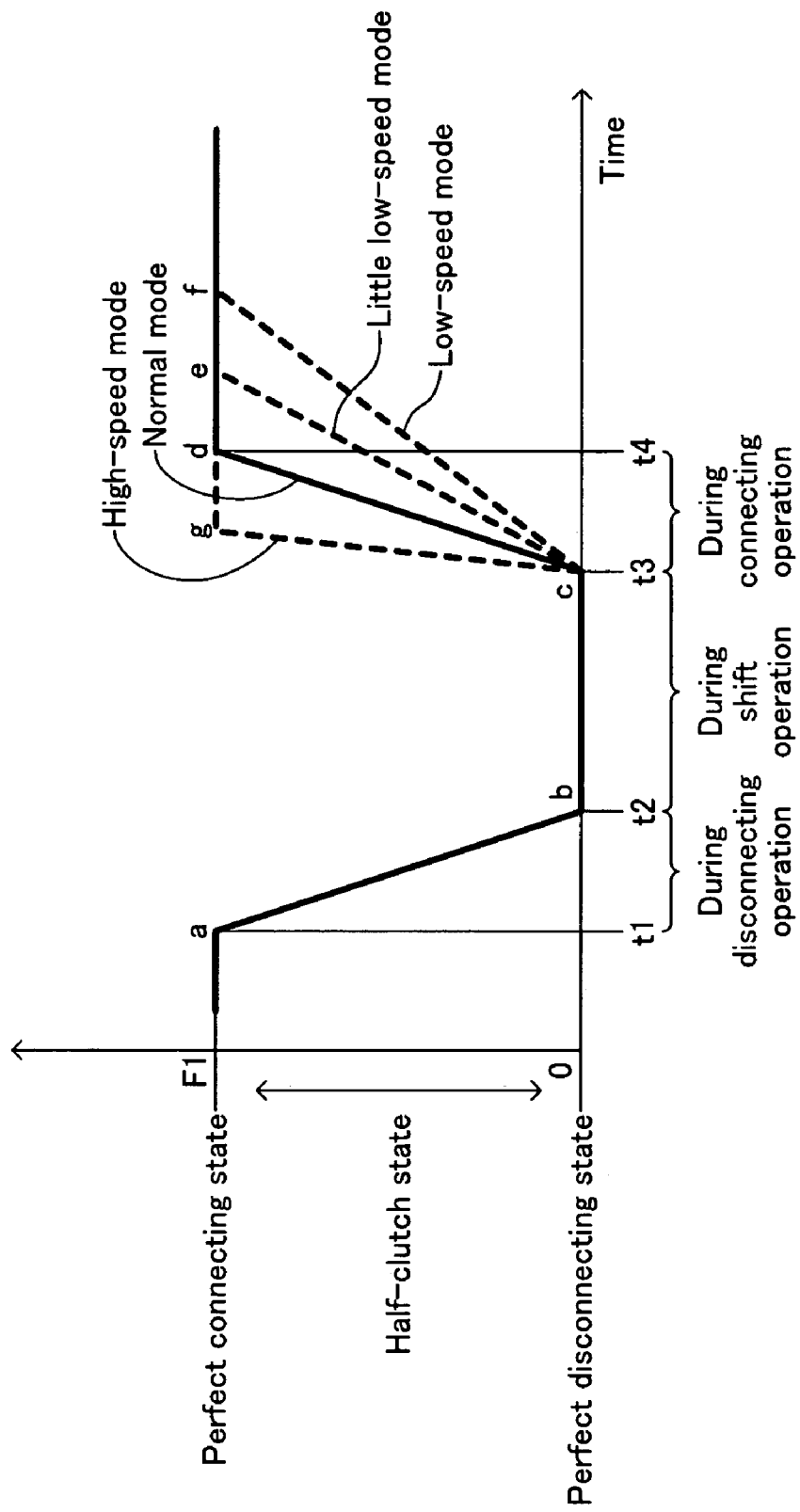
FIG. 4 is a time chart showing a change, with respect to a time, of press-contact force F exerted on a friction face of a clutch disc in a clutch shown in FIG. 1 when the clutch is driven so as to be connected or disconnected.

Explained hereinbelow with reference to FIG. 4 is a basic clutch connecting/disconnecting control and gear-shift control executed by this device. FIG. 4 is a time chart showing a change of the press-contact force F, exerted on the frictional face of the clutch disc in the clutch 24, to a time when the UP signal or DOWN signal is outputted from the shift position sensor 45 for driving the clutch 24 so as to be connected or disconnected. It is supposed in this time chart that the UP signal or DOWN signal is outputted from the shift position sensor 45 at a time t1.

Firstly, since the clutch 24 is in the perfect connecting state until the time t1, the press-contact force F is maintained to the maximum value F1 explained before. In other words, the driving force of the clutch connecting/disconnecting actuator 24a is "0". When the time has elapsed to become the time t1 from this state, this device starts to increase the driving force of the clutch connecting/disconnecting actuator 24a at a predetermined constant speed (constant increasing rate).

This allows the press-contact force F to decrease from the maximum value F1 (corresponding to a point a in FIG. 4) at a predetermined constant speed, whereby the disconnecting operation is started and executed for changing the state of the clutch 24 from the perfect connecting state to the perfect disconnecting state, and the clutch 24 is brought into a half-clutch state.

When the time has elapsed to become a time t2, the press-contact force F becomes "0" (corresponding to a point b in FIG. 4), so that the aforesaid disconnecting operation is completed and the clutch 24 is in the perfect disconnecting state. At this time, the clutch connecting/disconnecting actuator 24a outputs the signal indicating that the clutch 24 is in the perfect disconnecting state. A speed Vcut (disconnecting operation speed) of the disconnecting operation executed during the time t1 to the time t2 (hereinafter referred to as "during the disconnecting operation") is defined by the following formula 1.

$$V\text{cut} = F1/(t1-t/2) \quad \text{[Formula 1]}$$

On the other hand, this device executes "throttle valve opening control during disconnecting operation" during the aforesaid disconnecting operation, in order to prevent the occurrence of a racing of the engine 21 attributed to the fact that the load of the engine 21 is decreased with the decrease in the ratio of power, among the power of the engine 21, that can be transmitted to the transmission 25 by the clutch 24 as the disconnecting operation is proceeded.

Specifically, this device sets, during over the disconnecting operation, a predetermined allowable opening of the throttle valve that is decreased as the driving force of the clutch connecting/disconnecting actuator 24a increases. When the opening of the throttle valve TH corresponding to the operating amount Accp of the accelerator pedal AP by the driver exceeds the allowable opening, this device controls the throttle valve actuator 22 such that the opening of the throttle valve TH becomes the allowable opening.

Further, this device starts the gear-shift operation at the time t2 with the clutch 24 maintained in the perfect disconnecting state. Specifically, with the driving force of the clutch connecting/disconnecting actuator 24a maintained to the value at the time t2 (the press-contact force F is maintained to "0"), in case where the UP signal is outputted from the shift position sensor 45 at the time t1, this device starts to drive the gear-shift actuator 25a such that the forward gear stage of the transmission 25 is changed from the forward gear stage at present to the next forward gear stage (target stage) toward the high-speed side, while in case where the DOWN signal is outputted from the shift position sensor 45 at the time t1, this device starts to drive the gear-shift actuator 25a such that the forward gear stage of the transmission 25 is changed from the forward gear stage at present to the next forward gear stage (target stage) toward the low-speed side.

When the time has elapsed to become a time t3, this device completes to change the forward gear stage of the transmission 25 to the target gear stage (corresponding to a point c in FIG. 4). At this time, the gear-shift actuator 25a outputs the signal indicating that the gear-shift operation is completed, whereby the gear-shift operation (gear-shift control) is completed. The period during the time t2 to the time t3 is referred here to as "during shift operation".

On the other hand, this device executes "throttle valve opening control during shift operation" during the aforesaid shift operation, in order to prevent the occurrence of a racing of the engine 21 attributed to the fact that the clutch 24 is in the perfect disconnecting state and the engine 21 is in the unloaded condition. Specifically, during over the shift operation, this device controls the throttle valve actuator 22 such that, regardless of the operating amount Accp of the accelerator pedal AP by the driver, the opening of the throttle valve TH becomes the opening (constant value) of the throttle valve TH corresponding to the value at the time when the operating amount Accp of the accelerator pedal AP by the driver is "0".

Further, the time has elapsed to become the time t3, this device starts to decrease the driving force of the clutch connecting/disconnecting actuator 24a at a predetermined constant speed (constant decreasing rate). This allows the press-contact force F to increase from "0" (corresponding to the point c in FIG. 4) at a predetermined constant speed, whereby the connecting operation is started and executed for changing the state of the clutch 24 from the perfect disconnecting state to the perfect connecting state, and the clutch 24 is brought into a half-clutch state.

When the time has elapsed to become a time t4, the press-contact force F becomes the maximum value F1 (corresponding to a point d in FIG. 4) because the driving force of the clutch connecting/disconnecting actuator 24a becomes "0", so that the aforesaid connecting operation is completed and the clutch 24 is in the perfect connecting state. At this time, the clutch connecting/disconnecting actuator 24a outputs the signal indicating that the clutch 24 is in the perfect connecting state. Consequently, the clutch connecting/disconnecting operation is completed. A speed Vconnect (connecting operation speed) of the connecting operation executed during the time t3 to the time t4 (hereinafter referred to as "during the connecting operation") is defined by the following formula 2.

$$V\text{connect}=F1/(t4-t3) \quad \text{[Formula 2]}$$

On the other hand, this device executes "throttle valve opening control during connecting operation" during the aforesaid connecting operation, in order to transmit the power of the engine 21 to the maximum while preventing the occurrence of a racing of the engine 21, with the fact that the ratio of power, among the power of the engine 21, that can be transmitted to the transmission 25 by the clutch 24 increases as the connecting operation is proceeded.

Specifically, this device sets, during over the connecting operation, a predetermined allowable opening of the throttle valve that is increased as the driving force of the clutch connecting/disconnecting actuator 24a decreases. When the opening of the throttle valve TH corresponding to the operating amount Accp of the accelerator pedal AP by the driver exceeds the allowable opening, this device controls the throttle valve actuator 22 such that the opening of the throttle valve TH becomes the allowable opening.

As described above, corresponding to the clutch control means is means for controlling the clutch connecting/disconnecting actuator 24a so as to execute the disconnecting operation for changing the state of the clutch 24 from the perfect connecting state to the perfect disconnecting state before the gear-shift operation is started, and so as to execute the connecting operation for changing the state of the clutch 24 from the perfect disconnecting state to the perfect connecting state after the gear-shift operation is completed.

In this device, the above-mentioned connecting operation speed Vconnect is normally set to a value calculated according to the formula 2 and corresponding to the slope of a segment of a line connecting the point c and the point d shown by a solid line in FIG. 4. A mode where the connecting operation speed Vconnect is set to this value is called a normal mode.

Further, this device can select and set any one of a little low-speed mode wherein the connecting operation speed Vconnect is set to a value corresponding to the slope of a segment of a line connecting the point c and the point e shown by a broken line in FIG. 4, a low-speed mode wherein the connecting operation speed Vconnect is set to a value corresponding to the slope of a segment of a line connecting the point c and the point f shown by a broken line in FIG. 4 and a high-speed mode wherein the connecting operation speed Vconnect is set to a value corresponding to the slope of a segment of a line connecting the point c and the point g shown by a broken line in FIG. 4, besides the normal mode. This device selects any one of these modes except for the normal mode in accordance with a running state of a vehicle as described later.

[Selection of Connecting Operation Speed in Accordance with Road Friction Coefficient]

This device estimates a road friction coefficient μ of the road, on which the vehicle runs at present, based upon the following formula 3, and changes the connecting operation speed Vconnect in accordance with the road friction coefficient at the time (disconnecting operation starting point) when the clutch connecting/disconnecting control is started.

$$\mu=((k1 \cdot DVso)^2+(k2 \cdot Gy)^2)^{1/2} \quad \text{[Formula 3]}$$

In the aforesaid formula 3, DVso is an estimated body acceleration calculated as described later and Gy is an actual lateral acceleration detected by the above-mentioned lateral acceleration sensor 43. K1 and k2 are predetermined constants. Means for obtaining the road friction coefficient of the road based upon the formula 3 corresponds to road friction coefficient obtaining means.

Specifically, at the time (disconnecting operation starting point) when the above-mentioned clutch connecting/disconnecting control is started, this device selects the normal mode when the road friction coefficient μ is not less than 0.3, selects the little low-speed mode when the road friction coefficient μ is not less than 0.1 but less than 0.3 and selects the low-speed mode when the road friction coefficient μ is less than 0.1. Therefore, the connecting operation speed Vconnect is set so as to be decreased as the road friction coefficient μ is small.

Figure 5:
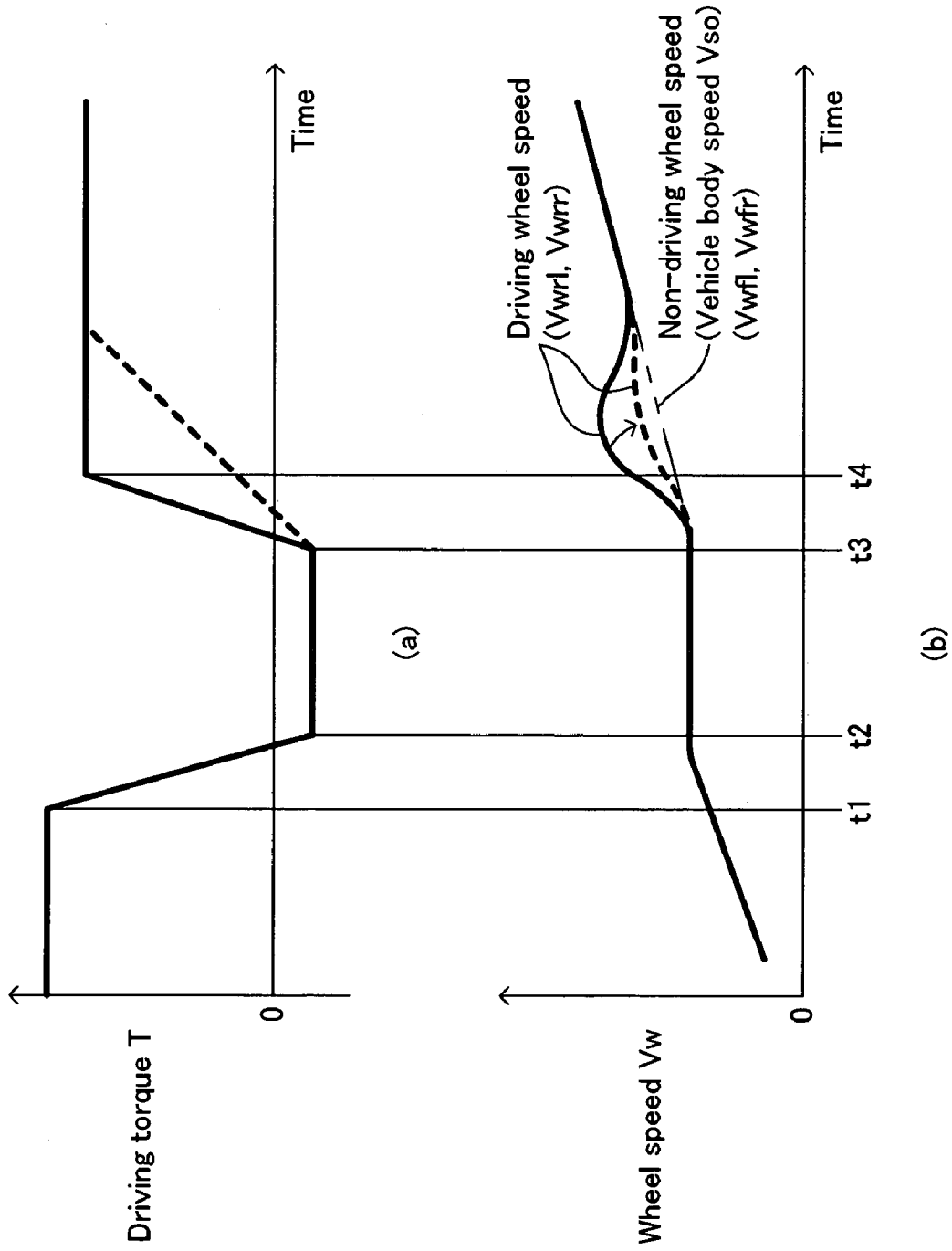
FIG. 5 is a time chart showing a change, with respect to a time, of a driving torque exerted on the driving wheel and a wheel speed of each wheel when a clutch/gear-shift control is executed during when a vehicle is running on a road having a small road friction coefficient, in order to explain an effect by the change in a connecting speed of the clutch according to a road friction coefficient.

FIG. 5 is a time chart showing a change of a driving torque T (supposing that the value in the accelerating direction is a positive value) exerted on the driving wheels RL and RR and a change of a wheel speed Vw of each wheel, in case where, when the vehicle accelerates on a road surface having the road friction coefficient μ of less than 0.1 with a state where the driver keeps the operating amount Accp of the accelerator pedal a predetermined constant value, the driver shifts the shift lever SL to the UP position for changing the forward gear stage of the transmission 25 to the next forward gear stage toward the high-speed side while maintaining the operating amount Accp of the accelerator pedal to the predetermined constant value.

In this case, this device sets the connecting operation speed Vconnect to the low-speed mode, not to the normal speed, since the road friction coefficient μ is less than 0.1. For comparing the case where the normal mode is set and the case where the low-speed mode is set, the change in case where the normal mode is set is shown by a solid line, while the change in case where the low-speed mode is set is shown by a broken line in FIG. 5. The times t1 to t4 in FIG. 5 respectively correspond to the time t1 to t4 in FIG. 4.

As shown in FIG. 5(a), the driving torque T exerted on the driving wheels RL and RR decreases from the positive predetermined value at a speed according to the aforesaid constant disconnecting operation speed Vcut, with the fact that the ratio of power, among the power of the engine 21, that can be transmitted to the transmission 25 by the clutch 24 decreases as the disconnecting operation is proceeded (and with the effect of the aforesaid "throttle valve opening control during disconnecting operation"), regardless of the operating amount Accp of the accelerator pedal maintained to the above-mentioned constant value.

Then, the driving torque T becomes a negative constant value during the period from the time t2 to the time t3 that is during the shift operation, since the clutch 24 is in the perfect disconnecting state. The fact that the driving torque T becomes the negative constant value is based upon the fact that the driving force from the engine 21 is not transmitted to the driving wheels RL and RR but rotational resistance force of a drive line member from the clutch 24 to the driving wheels RL and RR is exerted on the driving wheels RL and RR as a negative driving torque.

Moreover, in case where the connecting operation speed Vconnect is set to the normal mode (is calculated according to the formula 2), the driving torque T increases as shown by a solid line at a normal, relatively fast rate of change according to the constant connecting operation speed Vconnect that is set to the normal mode, with the fact that the ratio of power, among the power of the engine 21, that can be transmitted to the transmission 25 by the clutch 24 increases as the connecting operation is proceeded (and with the effect of the aforesaid "throttle valve opening control during connecting operation") regardless of the operating amount Accp of the accelerator pedal maintained to the above-mentioned constant value.

Similarly, in case where the connecting operation speed Vconnect is set to the low-speed mode like this device, the driving torque T increases as shown by a broken line at a slow rate of change (a rate of change slower than the normal rate of change) according to the connecting operation speed Vconnect that is set to the low-speed mode during the period from the time t3 to a predetermined time after the time t4.

On the other hand, it is assumed that, during from the time t1 to the time t3, the wheel speed Vw of each wheel is changed in a state where all wheel speeds become the same value with the driving wheels RL and RR not slipped in the accelerating direction, as shown in FIG. 5(b). When the connecting operation of the clutch 24 is started after the time t3, in case where the connecting operation speed Vconnect is set to the normal mode, the driving wheels RL and RR are greatly slipped in the accelerating direction over a predetermined period from the time little after the time t3, so that the wheel speeds Vwrl and Vwrr of the driving wheels RL and RR greatly exceed the wheel speeds Vwfl and Vwfr (shown by a two-dot chain line) of the non-driving wheels FL and FR as shown by a solid line in FIG. 5(b), since the rate of change (increasing speed) of the driving torque T exerted on the driving wheels RL and RR is relatively fast and the road friction coefficient μ is small as described above. As a result, the vehicle is likely to become unstable during the aforesaid predetermined period.

On the other hand, in case where the connecting operation speed Vconnect is set to the low-speed mode like this device, the driving wheels RL and RR are hardly slipped in the accelerating direction in spite of a small road friction coefficient μ, since the rate of change (increasing speed) of the driving torque T exerted on the driving wheels RL and RR is slow as described above, whereby the wheel speeds Vwrl and Vwrr of the driving wheels RL and RR exceed the wheel speeds Vwfl and Vwfr (shown by a two-dot-chain line) of the non-driving wheels FL and FR by a small degree. Accordingly, the vehicle stability can be maintained.

[Selection of Connecting Operation Speed Based Upon Whether Vehicle Stabilizing Control is now Being Executed or not]

This device executes a well-known ABS control, front-rear braking force distribution control, traction control and brake steering control by utilizing the brake hydraulic control apparatus 30. These controls are vehicle stabilizing controls wherein a target slip ratio St (target wheel speed related amount) of each wheel is set according to the running state of the vehicle and braking force exerted on each wheel is controlled such that the actual slip ratio Sa (actual wheel speed related amount) of each wheel becomes the target slip ratio St, thereby stabilizing the running state of the vehicle. The means for executing the vehicle stabilizing control as described above corresponds to vehicle stabilizing control executing means.

In case where any one of the vehicle stabilizing controls is executed at the time (disconnecting operation starting point) when the above-mentioned clutch connecting/disconnecting control is started for performing the gear-shift control, this device continuously executes the above-mentioned any one of the vehicle stabilizing controls over a period when the clutch connecting/disconnecting operation is executed (during the period from the disconnecting operation starting point to the connecting operation completing point), regardless of whether the above-mentioned any one of the vehicle stabilizing controls is needed or not.

Further, this device changes the connecting operation speed Vconnect depending upon whether the vehicle stabilizing control is executed or not at the time when the clutch connecting/disconnecting control is started. Specifically, this device selects the normal mode when the vehicle stabilizing control is not executed, while selects the low-speed mode when the vehicle stabilizing control is executed. This allows to set the connecting operation speed Vconnect, of the case where the vehicle stabilizing control is executed, slower than that of the case where the vehicle stabilizing control is not executed.

Figure 6:
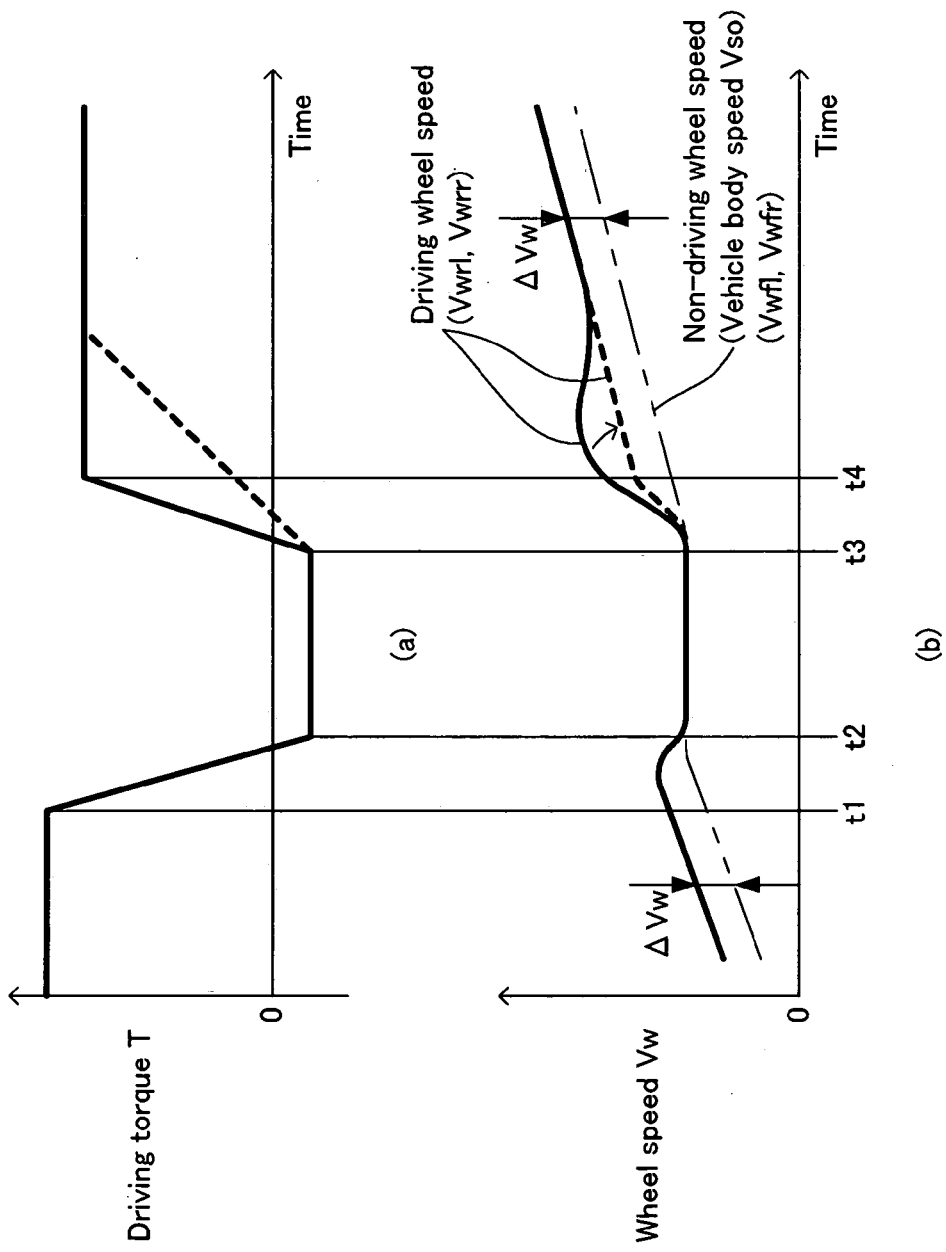
FIG. 6 is a time chart showing a change, with respect to a time, of a driving torque exerted on the driving wheel and a wheel speed of each wheel when a clutch/gear-shift control is executed during a traction control, in order to explain an effect by the change in a connecting speed of the clutch based upon whether a vehicle stabilizing control is now being executed or not.

FIG. 6 is a time chart showing a change of a driving torque T (supposing that the value in the accelerating direction is a positive value) exerted on the driving wheels RL and RR and a change of a wheel speed Vw of each wheel, in case where, when a vehicle is accelerated with a state in which a well-known traction control is suitably executed by maintaining the operating amount Accp of the accelerator pedal to a predetermined great value by a driver and the (accelerating) slip amount (a speed obtained by subtracting a body speed (wheel speed of non-driving wheel) from the wheel speed of the driving wheel) of the driving wheels RL and RR is maintained to the target slip amount Δ Vw of the traction control, the driver shifts the shift lever SL to the UP position for changing the forward gear stage of the transmission 25 to the next forward gear stage toward the high-speed side while maintaining the operating amount Accp of the accelerator pedal to the predetermined great value.

In this case, this device sets the connecting operation speed Vconnect to the low-speed mode, not to the normal speed, since the traction control is executed at the t1 when the disconnecting operation is started. For comparing the case where the normal mode is set and the case where the low-speed mode is set, like FIG. 5, the change in case where the normal mode is set is shown by a solid line, while the change in case where the low-speed mode is set is shown by a broken line in FIG. 6. The times t1 to t4 in FIG. 6 respectively correspond to the time t1 to t4 in FIG. 4. It is to be noted that, since the change in the driving torque T shown in FIG. 6(a) is the same as the change in the driving torque T shown in FIG. 5(a), the explanation about the change in the driving torque T is omitted here.

As shown in FIG. 6(b), the wheel speeds Vwrl and Vwrr (shown by the solid line) of the driving wheels RL and RR increase, by the time t1, with the increase of the body speed of the vehicle with a state where wheel speeds Vwrl and Vwrr are maintained to a value greater than the wheel speeds Vwfl and Vwfr (shown by a two-dot-chain line) of the non-driving wheels FL and FR by the target slip amount $\Delta$ Vw due to the traction control.

During the period from the time t1 to the time t2 that is during the disconnecting operation, the wheel speeds Vwrl and Vwrr of the driving wheels RL and RR gradually approach to the wheel speeds Vwfl and Vwfr of the non-driving wheels FL and FR with the decrease of the driving torque T exerted on the driving wheels RL and RR as the disconnecting operation is proceeded, and then, they are the same as the wheel speeds Vwfl and Vwfr of the non-driving wheels FL and FR at the time t2 when the disconnecting operation is completed. In other words, the slip amount of the driving wheels RL and RR becomes "0". The wheel speeds Vwrl and Vwrr of the driving wheels RL and RR are also the same as the wheel speeds Vwfl and Vwfr of the non-driving wheels FL and FR during the period from the time t2 to the time t3 when the shift operation is completed, since the clutch 24 is in the perfect disconnecting state.

When the connecting operation of the clutch 24 is started after the time t3, the rate of change (increasing speed) of the driving torque T exerted on the driving wheels RL and RR is relatively fast as described above in case where the connecting operation speed Vconnect is set to the normal mode, whereby the driving wheels RL and RR are greatly slipped in the accelerating direction from the time little after the time t3. In this case, it is difficult to immediately return the slip amount of the driving wheels RL and RR to the target slip amount $\Delta$ Vw even if the slip amount of the driving wheels RL and RR exceeds the target slip amount $\Delta$ Vw of the traction control, since such fast rate of change in the driving torque T becomes a great disturbance in the traction control. Accordingly, the slip amount of the driving wheels RL and RR greatly exceeds the target slip amount $\Delta$ Vw of the traction control over a predetermined period from the time little after the time t3, as shown by the solid line in FIG. 6(b). As a result, the traction control is not precisely executed during the above-mentioned predetermined period, resulting in that the vehicle is likely to be unstable.

On the other hand, in case where the connecting operation speed Vconnect is set to the low-speed mode as in this device, the rate of change (increasing speed) in the driving torque T exerted on the driving wheels RL and RR is slow as described above. Such slow change in the driving torque T cannot become a great disturbance in the traction control. Therefore, even if the driving wheels RL and RR are started to be slipped in the accelerating direction from the time little after the time t3 and the slip amount of the driving wheels RL and RR intends to exceed the target slip amount $\Delta$ Vw of the traction control, the slip amount can immediately be returned to the target slip amount $\Delta$ Vw. Accordingly, after the slip amount of the driving wheels RL and RR reaches the target slip amount $\Delta$ Vw of the traction control at the time little after the time t3, the slip amount of the driving wheels RL and RR can be maintained to the target slip amount $\Delta$ Vw as shown by the broken line in FIG. 6(b), whereby, in this case, the traction control can precisely be executed and the vehicle stability can be maintained.

[Selection of Connecting Operation Speed Based Upon Whether it is a Sports Running Mode or Not]

A case where an operation on an accelerator pedal is performed by a driver such that the operating amount Accp of the accelerator pedal continuously becomes greater than a predetermined value A over a predetermined period means that there is a demand by the driver that he or she wants to get an acceleration greater than that obtained in the case of the normal running state of the vehicle. In this case, shortening the period (from the disconnecting operation starting point to the connecting operation completing point) when the driving force cannot be exerted on the driving wheel due to the clutch 24 that is brought into the disconnecting state meets the demand of the driver.

Therefore, this device judges that the vehicle is in the sports running mode when the predetermined operation is executed, and changes the connecting operation speed Vconnect according to whether the vehicle is in the sports running mode or not at the time (disconnecting operation starting point) when the clutch connecting/disconnecting operation is started. The means for determining whether the predetermined operation is executed or not corresponds here to determining means.

Specifically, this device selects the normal mode when the vehicle is not in the sports running mode at the time when the clutch connecting/disconnecting operation is started, while selects the high-speed mode when the vehicle is in the sports running mode. This allows to set the connecting operation speed Vconnect of the case where the vehicle is in the sports running mode faster than that of the case where the vehicle is not in the sports running mode.

Figure 7:
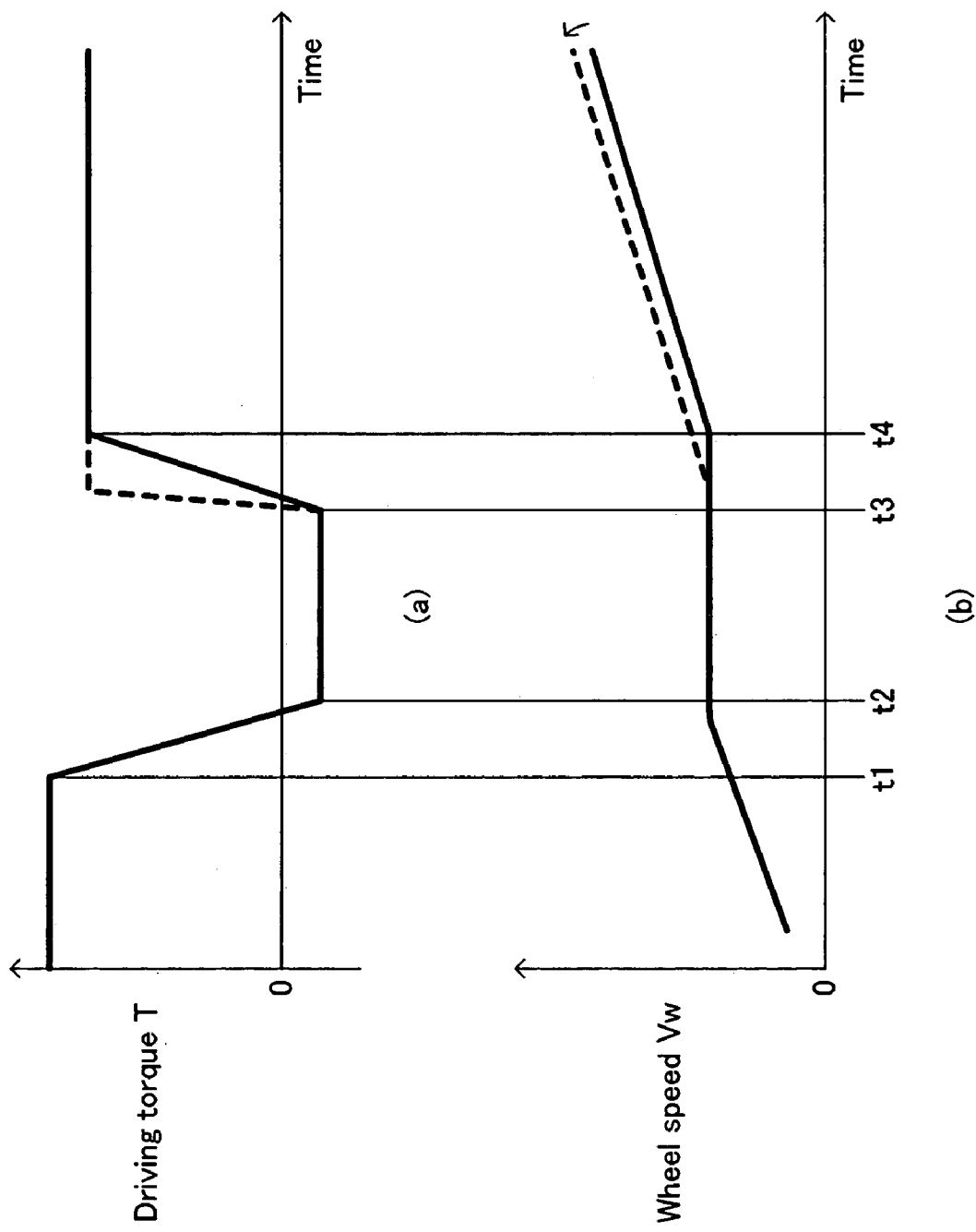
FIG. 7 is a time chart showing a change, with respect to a time, of a driving torque exerted on the driving wheel and a wheel speed of each wheel when a clutch/gear-shift control is executed during when a vehicle is in a sports running mode, in order to explain an effect by the change in a connecting speed of the clutch based upon whether the vehicle is in the sports running mode or not.

FIG. 7 is a time chart showing a change of the driving torque T (supposing that the value in the accelerating direction is a positive value) exerted on the driving wheels RL and RR and a change of the wheel speed Vw of each wheel, in case where, when an operation on an accelerator pedal is performed by a driver such that the operating amount Accp of the accelerator pedal continuously becomes greater than a predetermined value A over a predetermined period and a vehicle is accelerated with a state in which the driver maintains the operating amount Accp of the accelerator pedal to the predetermined constant value (a value greater than the predetermined value A), the driver shifts the shift lever SL to the UP position for changing the forward gear stage of the transmission 25 to the next forward gear stage toward the high-speed side while maintaining the operating amount Accp of the accelerator pedal to the predetermined great value.

In this case, this device sets the connecting operation speed Vconnect to the high-speed mode, not to the normal speed, since the vehicle is in the sports running mode. For comparing the case where the normal mode is set and the case where the high-speed mode is set, the change in case where the normal mode is set is shown by a solid line, while the change in case where the high-speed mode is set is shown by a broken line in FIG. 7. The times t1 to t4 in FIG. 7 respectively correspond to the time t1 to t4 in FIG. 4.

As shown in FIG. 7(a), the driving torque T increases as shown by the solid line at a normal rate of change according to the connecting operation speed Vconnect that is set to the normal mode during the time t3 to the time t4 that is during the connecting operation, like the cases shown in FIG. 5(a) and FIG. 6(a), in case where the connecting operation speed Vconnect is set to the normal mode (in case it is calculated according to the formula 2).

Similarly, the driving torque T increases as shown by the broken line at a fast rate of change according to the connecting operation speed Vconnect that is set to the high-speed mode during the period from the time t3 to the predetermined time that is after the time t3 and a little before the time t4, that is during the connecting operation, in case where the connecting operation speed Vconnect is set to the high-speed mode like this device.

On the other hand, it is assumed that, during the period shown in the figure, the wheel speed Vw of each wheel is changed in a state where all wheel speeds become the same value with the driving wheels RL and RR not-slipped in the accelerating direction, as shown in FIG. 7(b). When the connecting operation of the clutch 24 is started after the time t3, in case where the connecting operation speed Vconnect is set to the high-speed mode, the connecting operation is completed at earlier stage compared to the case where the connecting operation speed Vconnect is set to the normal mode. In other words, the period in the clutch connecting/disconnecting operation (from the disconnecting operation starting point to the connecting operation completing point) can be shortened, so that the vehicle can be returned again to the accelerating state from the earlier stage. Therefore, when the predetermined operation is executed by the driver, the control that meets the demand of the driver can be executed.

As described above, this device selects one of the four modes shown in FIG. 4 for setting the connecting operation speed Vconnect from the following three viewpoints: the value of the road friction coefficient μ at the time (disconnecting operation starting point) when the clutch connecting/disconnecting operation is started; whether the vehicle stabilizing control is executed or not at this point; and whether the vehicle is in the sports running mode or not at this point. When each of the selected modes is different, this device finally decides the connecting operation speed Vconnect as described below.

Specifically, at first, this device selects the mode at the lower-speed side of the connecting operation speed Vconnect selected from the viewpoint of the road friction coefficient μ and the connecting operation speed Vconnect selected from the viewpoint of whether the vehicle stabilizing control is executed or not. When the selected mode at the lower-speed side is other than the normal mode (i.e., it is the little low-speed mode or low-speed mode), this device sets the selected mode at the lower-speed side as the final mode of the connecting operation speed Vconnect.

On the other hand, when the selected mode at the lower-speed side is the normal mode, this device sets the connecting operation speed Vconnect selected from the viewpoint of whether the vehicle is in the sports running mode or not as the final mode as it is of the connecting operation speed Vconnect. This permits that the mode (i.e., the little low-speed mode or low-speed mode) at the lower-speed side with respect to the normal mode has a priority to be set over the high-speed mode from the viewpoint of assuring the stability of the vehicle, in case where there is a fear that the vehicle becomes unstable even if the vehicle is in the sports running mode. The disclosure explained above is the outline of the clutch connecting/disconnecting operation and gear-shift operation according to the present invention.

[Actual Operation]

Subsequently, the actual operation of the control device 10 for a vehicle including the automatic clutch control device of the present invention and having the above-mentioned construction will be explained hereinbelow with reference to FIGS. 8 to 15 showing routines with flowcharts executed by the CPU 51 of the electrical control apparatus 50. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 8:
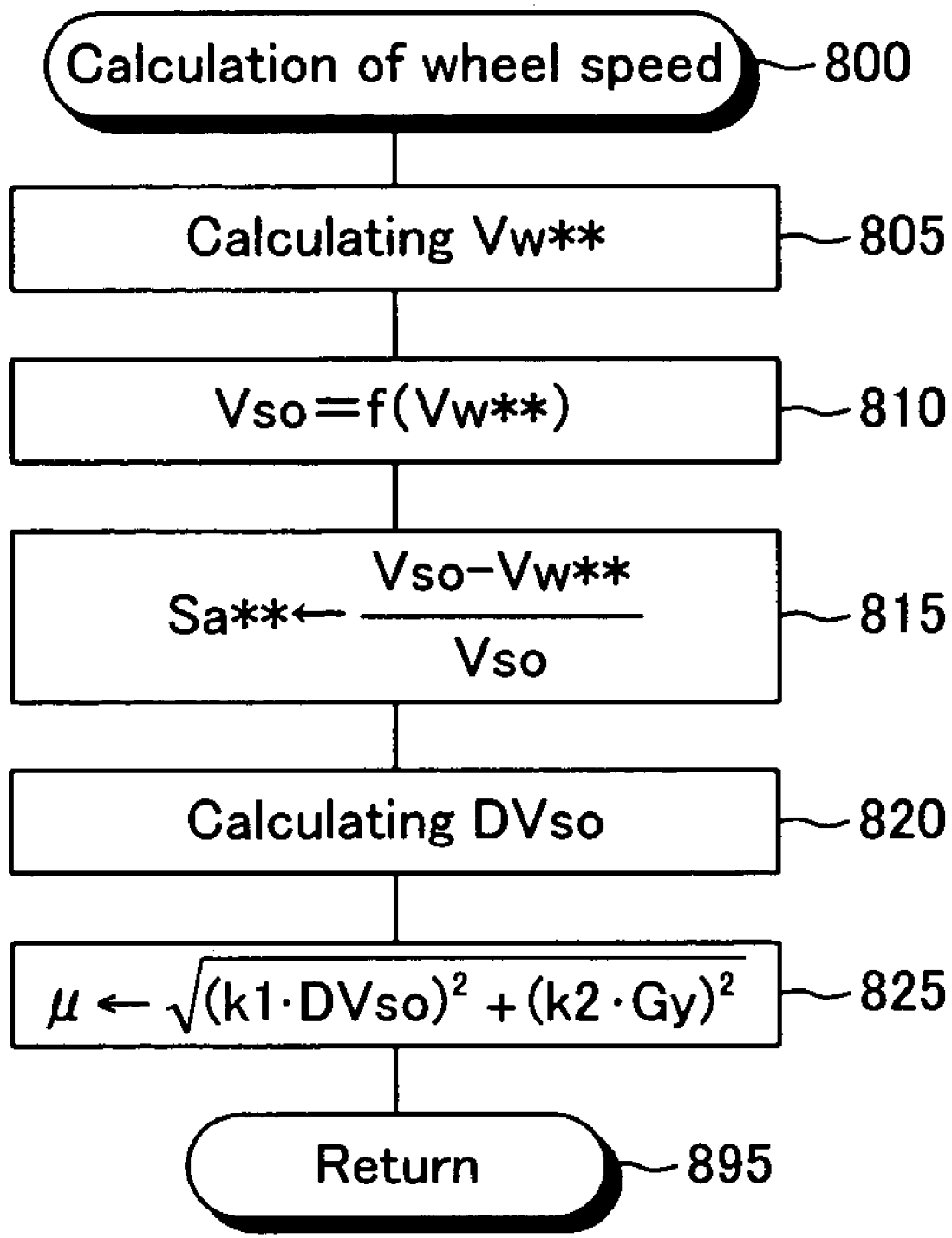

The CPU 51 repeatedly executes a routine shown in FIG. 8 for calculating the wheel speed Vw or the like once every predetermined period. Accordingly, the CPU 51 starts the process from a step 800 at a predetermined timing, and then proceeds to a step 805 to respectively calculate the wheel speed (outer circumferential speed of each wheel) Vw of each wheel FR or the like. Specifically, the CPU 51 respectively calculates the wheel speed Vw of each wheel FR or the like based upon an interval of a pulse possessed by the signal outputted from each wheel speed sensor 41.

Next, the CPU 51 proceeds to a step 810 for calculating the estimated vehicle body speed Vso based upon a function f that is a function of the wheel speed Vw of each wheel FR or the like. Then, the CPU 51 proceeds to a step 815 for calculating the actual slip ratio Sa of every wheel based upon the estimated vehicle body speed Vso calculated at the step 810, the wheel speed values Vw of each wheel FR or the like calculated at the step 805 and the formula disclosed in a step 815. This actual slip ratio Sa is used for calculating braking force that should be exerted on each wheel based upon the vehicle stabilizing control as described later.

Then, the CPU 51 proceeds to a step 820 for calculating an estimated vehicle body acceleration DVso that is a time derivative value of the estimated vehicle body speed Vso.

$$DVso=(Vso-Vso1)/\Delta t \qquad \text{[Formula 4]}$$

In the formula 4, Vso1 is the previous estimated vehicle body speed calculated at the step 810 at the time of the previous execution of this routine, while Δt is the above-mentioned predetermined time that is the operation period of this routine.

Then, the CPU 51 proceeds to a step 825 for estimating the road friction coefficient μ based upon the estimated vehicle body speed DVso calculated at the step 820, the value of the actual lateral acceleration Gy obtained by the lateral acceleration sensor 43 and the formula disclosed in the step 825 corresponding to the right side of the formula 3.

The maximum value among the values obtained from the previous execution of this routine by the predetermined number of times to the present execution of this routine may be applied as the value of the estimated vehicle body speed DVso and the value of the actual lateral acceleration Gy used for the calculation at the step 825. Then, the CPU 51 proceeds to a step 895 to temporarily complete this routine.

Subsequently, a setting of the vehicle stabilizing control mode will be explained. The CPU 51 repeatedly executes a routine shown in FIG. 9 once every predetermined period. Accordingly, the CPU 51 starts the process from a step 900 at a predetermined timing for determining whether or not the value of a clutch/gear-shift control now-executing flag XSHIFT is "0". The clutch/gear-shift control now-executing flag XSHIFT here represents that the above-mentioned clutch/gear-shift control (clutch connecting/disconnecting control) is executed when the value thereof is "1", while represents that the clutch/gear-shift control is not executed when the value thereof is "0".

When the value of the clutch/gear-shift control now-executing flag XSHIFT is "1" in the judgement at the step 905, the CPU 51 makes "No" determination at the step 905 to immediately move to a step 995 for temporarily terminating this routine. By this process, the vehicle stabilizing control mode already selected at a step, described later, of this routine at the time (disconnecting operation starting point) when the clutch/gear-shift control is started is maintained as it is during over the clutch/gear-shift control (the period from the disconnecting operation starting point to the connecting operation completing point).

The explanation is continued here assuming that the clutch/gear-shift control is not executed. The CPU 51 makes "Yes" determination at the step 905 and moves to a step 910 for determining whether the ABS control is required or not at present. The ABS control is a control for decreasing the braking force of the specified wheel in case where the specified wheel is locked with the brake pedal BP operated. The detail of the ABS control is well-known, so that the detailed explanation thereof is omitted here.

Specifically, the CPU 51 determines at the step 910 that the ABS control is needed, in case where the brake switch 44 shows that the brake pedal BP is operated and the case where the actual slip ratio $Sa^{}$ of the specified wheel calculated at the step 815 of FIG. 8** is not less than the predetermined positive value.

When the ABS control is needed in the judgement at the step 910, the CPU 51 proceeds to a step 915 where "1" is set to a variable Mode for setting a control mode executed by performing both the brake steering control described later and the ABS control. Then, the CPU 51 proceeds to a next step 955.

On the other hand, when the ABS control is not needed in the judgement at the step 910, the CPU 51 proceeds to a step 920 for determining whether the front-rear braking force distribution control is needed or not at present. The front-rear braking force distribution control is a control for decreasing a ratio (distribution) of the braking force of rear wheels to the braking force of front wheels in accordance with a magnitude of a deceleration in the front-rear direction of the vehicle with the brake pedal BP operated. The detail of the front-rear braking force distribution control is well-known, so that the detailed explanation thereof is omitted here.

Specifically, the CPU 51 judges at the step 920 that the front-rear braking force distribution control is needed, in case where the brake switch 44 shows that the brake pedal BP is operated and the case where the estimated vehicle body speed DVso calculated at the step 820 of FIG. 8 is a negative value and its absolute value is not less than the predetermined value.

When the front-rear braking force distribution control is needed in the judgement at the step 920, the CPU 51 proceeds to a step 925 where "2" is set to a variable Mode for setting a control mode executed by performing both the brake steering control and the front-rear braking force distribution control. Then, the CPU 51 proceeds to the next step 955.

When the front-rear braking force distribution control is not needed in the judgement at the step 920, the CPU 51 proceeds to a step 930 for determining whether the traction control is needed or not at present. The traction control is a control for increasing the braking force of the specified wheel or decreasing the driving force of the engine 21 in case where the specified wheel is spun in the direction where the driving force of the engine 21 is generated with the brake pedal BP operated. The detail of the traction control is well-known, so that the detailed explanation thereof is omitted here.

Specifically, the CPU 51 judges at the step 930 that the traction control is needed, in case where the brake switch 44 shows that the brake pedal BP is operated and the case where the actual slip ratio $Sa^{}$ of the specified wheel calculated at the step 815 of FIG. 8** is a negative value and its absolute value is not less than the predetermined value.

When the traction control is needed in the judgement at the step 930, the CPU 51 proceeds to a step 935 where "3" is set to a variable Mode for setting a control mode executed by performing both the brake steering control and the traction control. Then, the CPU 51 proceeds to the next step 955.

When the traction control is not needed in the judgement at the step 930, the CPU 51 proceeds to a step 940 for determining whether the brake steering control is needed or not at present. The brake steering control is a control wherein, in case where the vehicle is in an understeer state or in an oversteer state, a predetermined yawing moment is produced on the vehicle by producing braking force on a predetermined wheel, thereby approaching the state of the vehicle to a neutral steer state. The detail of the brake steering control is well-known, so that the detailed explanation thereof is omitted here.

When the brake steering control is needed in the judgement at the step 940, the CPU 51 proceeds to a step 945 where "4" is set to a variable Mode for setting a control mode executed by performing both the brake steering control and the traction control. Then, the CPU 51 proceeds to the next step 955. On the other hand, when it is determined that the brake steering control is not needed in the judgement of the step 945, the CPU 51 proceeds to a step 950 where "5" is set to a variable Mode for setting a non-control mode wherein the vehicle stabilizing control is not executed, and then, proceeds to the next step 955. In this case, the specified wheel that should be controlled is not present.

When the CPU 51 proceeds to the step 955, it sets "1" to a flag $CONT^{}$ corresponding to a wheel to be controlled, while sets "0" to a flag $CONT^{}$ corresponding to a wheel not to be controlled, that is not the wheel to be controlled. The wheel to be controlled at this step 955 is a wheel that is required to control at least one of the corresponding pressure increasing valve $PU^{}$ and the pressure decreasing valve $PD^{}$ shown in FIG. 2.

Accordingly, in case where the brake pedal BP is not operated and only the brake fluid pressure in the wheel cylinder Wfr of the front-right wheel is required to be increased, for example, the control valve SA1, change-over valve STR and pressure increasing valve PUfl shown in FIG. 2 are switched over to the second position and the pressure increasing valve PUfl and the pressure decreasing valve PDfr are respectively controlled, whereby only the brake fluid pressure in the wheel cylinder Wfr is increased by utilizing the high pressure generated from the high-pressure generating section 31 while keeping the brake fluid pressure in the wheel cylinder Wfl to be the fluid pressure at this time. Therefore, not only the front-right wheel FR but also the front-left wheel FL are included in the wheels to be controlled in this case. After executing the step 955, the CPU 51 proceeds to a step 995 for temporarily terminating this routine. As described above, the vehicle stabilizing control mode is specified and the wheel to be controlled is specified.

Subsequently explained is the control of the braking force that should be exerted on each driving wheel. The CPU 51 repeatedly executes the routine shown in FIG. 10 once every predetermined period. Accordingly, the CPU 51 starts the process from a step 1000 at a predetermined timing, and then, proceeds to a step 1005 to determine whether the variable Mode is "0" or not. If the variable Mode is "0", it makes "No" determination at the step 1005 to proceed to a step 1010 where all the solenoid-operated valves in the brake hydraulic control apparatus 30 are turned off (non-actuated state) since the braking control is not required to be executed to each wheel, and thereafter, moves to a step 1095 to temporarily complete this routine. By this process, brake hydraulic pressure according to the control force of the brake pedal BP by the driver is supplied to each wheel cylinder W**.

Figure 9:
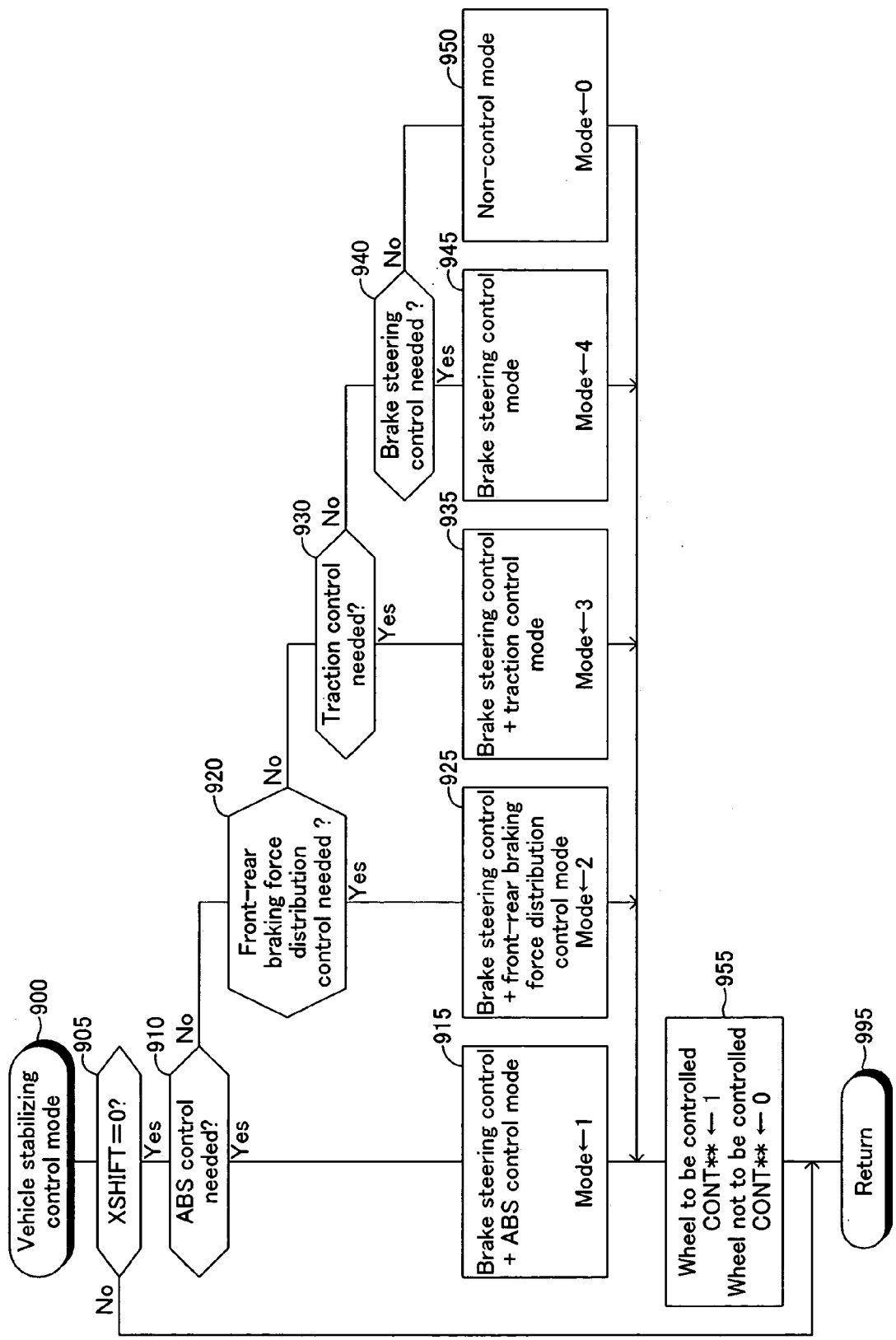
FIG. 9 is a flowchart showing a routine, executed by the CPU shown in FIG. 1, for setting a vehicle stabilizing control mode.
Figure 10:
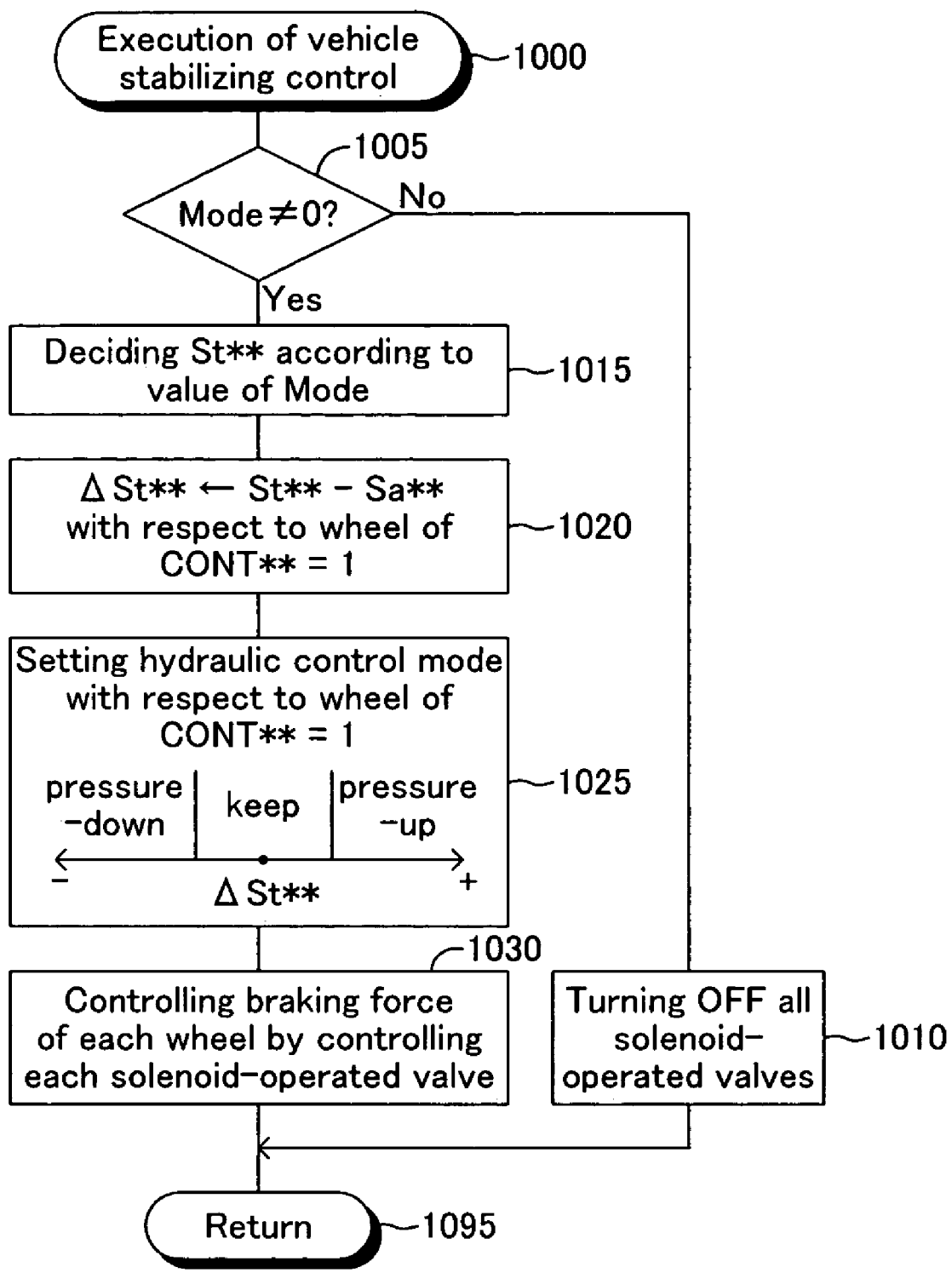
FIG. 10 is a flowchart showing a routine, executed by the CPU shown in FIG. 1, for controlling braking force exerted on each wheel based upon a road friction coefficient.
Figure 11:
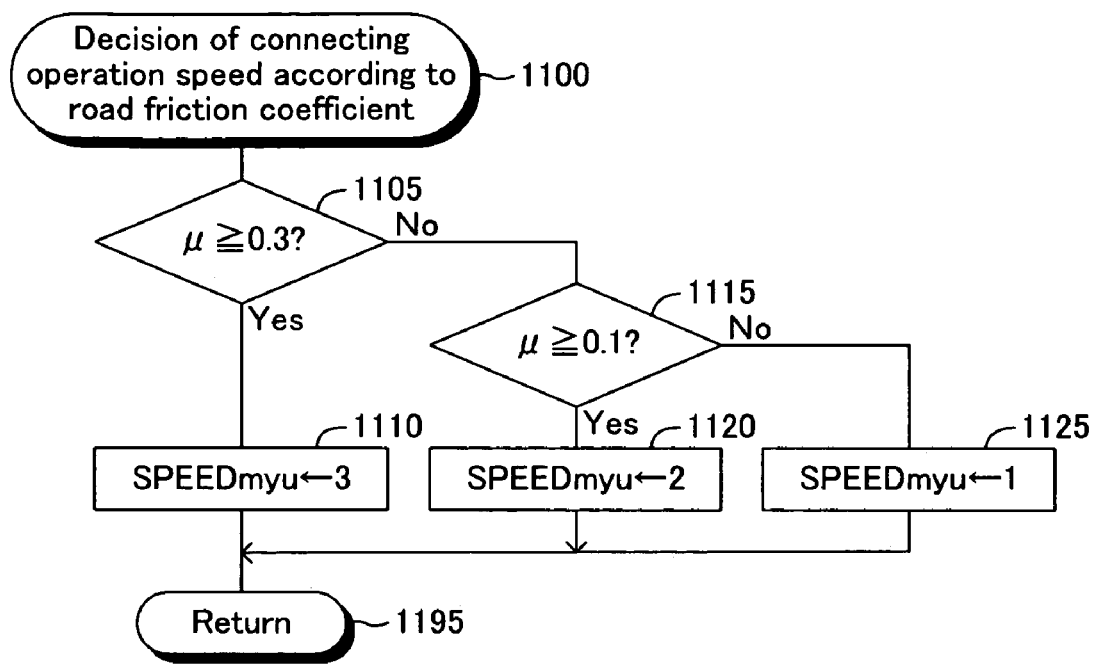
FIG. 11 is a flowchart showing a routine, executed by the CPU shown in FIG. 1, for deciding a connecting operation speed according to a road friction coefficient.
Figure 12:
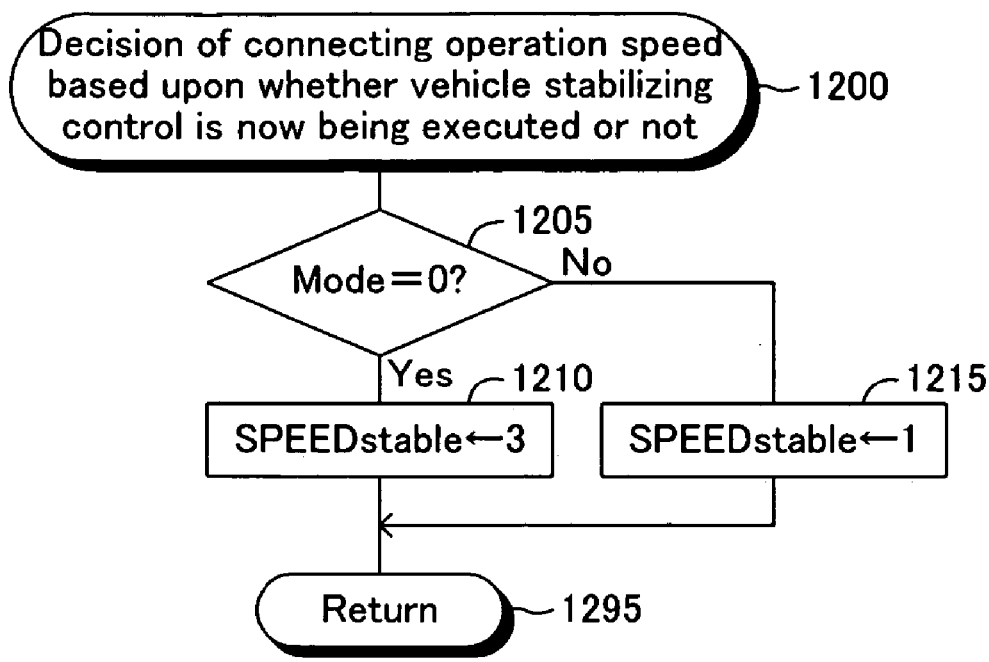
FIG. 12 is a flowchart showing a routine, executed by the CPU shown in FIG. 1, for deciding a connecting operation speed based upon whether the vehicle stabilizing control is now executed or not.

On the other hand, if the variable Mode is not "0" in the judgement at the step 1005, the CPU 51 makes "Yes" determination at the step 1005, and proceeds to a step 1015 for setting, every wheel to be controlled, the target slip ratio St** of each wheel that should be set for executing the vehicle stabilizing control corresponding to the value of the variable Mode set at present by the execution of the routine of FIG. 9.

Subsequently, the CPU 51 proceeds to a step 1020 for setting, to the wheel to be controlled having the value of the flag CONT of "1" set at the step 955 in FIG. 9, a slip ratio deviation ΔSt every wheel to be controlled based upon the value of the target slip ratio St, the value of the actual slip ratio Sa calculated at the step 815 in FIG. 8 and the formula disclosed in the step 1020.

Then, the CPU 51 proceeds to a step 1025 for setting a hydraulic control mode with respect to the wheel to be controlled every wheel to be controlled. Specifically, every wheel to be controlled, the CPU 51 sets the hydraulic control mode to "pressure-up" when the value of the slip ratio deviation ΔSt exceeds the predetermined positive reference value, sets the hydraulic control mode to "keep" when the value of the slip ratio deviation ΔSt is not less than the predetermined negative reference value but not more than the predetermined positive reference value, and sets the hydraulic control mode to "pressure-down" when the value of the slip ratio deviation ΔSt is less than the predetermined negative reference value, based upon the value of the slip ratio deviation ΔSt calculated at the step 1020 every wheel to be controlled and the table disclosed in the step 1025.

Subsequently, the CPU 51 proceeds to a step 1030 where it controls the control valves SA1 and SA2 and the change-over valve STR shown in FIG. 2 based upon the hydraulic control mode set at the step 1025 every wheel to be controlled and further it controls the pressure increasing valve PU and pressure reducing valve PD according to the hydraulic control mode every wheel to be controlled.

Specifically, the CPU 51 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the vehicle stabilizing control mode set in FIG. 9 can be achieved.

It is to be noted that, when the control mode set by the execution of the routine of FIG. 9 is the control mode (variable Mode=3) for executing the traction control mode or the control mode (variable Mode=4) for executing only the brake steering control mode, the CPU 51 controls, according to need, the throttle valve actuator 22 such that the opening of the throttle valve TH becomes smaller by a predetermined amount than the opening according to the operating amount of the accelerator pedal AP, in order to reduce the driving force of the engine 21. Then, the CPU 51 proceeds to the step 1095 for temporarily terminating this routine.

Subsequently explained is the decision of the connecting operation speed according to the road friction coefficient μ. The CPU 51 repeatedly executes the routine shown in FIG. 11 once every predetermined period. Accordingly, the CPU 51 starts the process from a step 1100 at a predetermined timing, and then, proceeds to a step 1105 to determine whether the road friction coefficient μ calculated at the step 825 in FIG. 8 is not less than 0.3 or not. If the road friction coefficient μ is not less than 0.3, it makes "Yes" determination at the step 1105 to proceed to a step 1110 where a value of a variable SPEEDmyu is set to "3", and then, proceeds to a step 1195 to temporarily complete this routine. The variable SPEEDmyu here is a value representing a mode of the connecting operation speed Vconnect selected from the viewpoint of the road friction coefficient μ, and the value of "3" corresponds to the above-mentioned normal mode.

On the other hand, if the road friction coefficient μ is less than 0.3 in the judgement at the step 1105, the CPU 51 makes "No" determination at the step 1105 to move to a step 1115 where the road friction coefficient μ is not less than 0.1 or not. If the road friction coefficient μ is not less than 0.1, the CPU 51 makes "Yes" determination at the step 1115 to move to a step 1120 where the value of the variable SPEEDmyu is set to "2", and then, proceeds to the step 1195 to temporarily complete this routine. The value of "2" corresponds here to the little low-speed mode.

Further, if the road friction coefficient μ is less than 0.1 in the judgement at the step 1115, the CPU 51 makes "No" determination at the step 1115 to move to a step 1125 where the variable SPEEDmyu is set to "1", and then, proceeds to the step 1195 to temporarily complete this routine. The value of "1" corresponds here to the low-speed mode.

Subsequently explained is the decision of the connecting operation speed based upon whether the vehicle stabilizing control is now being executed or not. The CPU 51 repeatedly executes the routine shown in FIG. 12 once every predetermined period. Accordingly, the CPU 51 starts the process from a step 1200 at a predetermined timing, and then, proceeds to a step 1205 to determine whether the value of the variable Mode set in the execution of the routine of FIG. 9 is "0" or not. The value of "0" of the variable Mode means that the vehicle stabilizing control is not executed at present, while the value other than "0" of the variable Mode means that the vehicle stabilizing control is executed at present.

If the value of the variable Mode is "0" (i.e., the vehicle stabilizing control is not executed), the CPU 51 makes "Yes" determination at the step 1205 to proceed to a step 1210 where a value of a variable SPEEDstable is set to "3", and then, proceeds to a step 1295 to temporarily complete this routine. The variable SPEEDstable here is a value representing a mode of the connecting operation speed Vconnect selected from the viewpoint of the vehicle stabilizing control now being executed or not, and the value of "3" corresponds to the above-mentioned normal mode, like the value of "3" of the variable SPEEDmyu.

On the other hand, if the value of the variable Mode is not "0" in the judgement at the step 1205 (i.e., the vehicle stabilizing control is now being executed), the CPU 51 makes "No" determination at the step 1205 to move to a step 1215 where the value of the variable SPEEDstable is set to "1", and then, proceeds to the step 1195 to temporarily complete this routine. The value of "1" corresponds here to the low-speed mode, like the value of "1" of the variable SPEEDmyu.

Subsequently explained is the decision of the connecting operation speed based upon whether the vehicle is in the sports running mode or not. The CPU 51 repeatedly executes the routine shown in FIG. 13 once every predetermined period. Accordingly, the CPU 51 starts the process from a step 1300 at a predetermined timing, and then, proceeds to a step 1305 to determine whether or not the operating amount Accp of the accelerator pedal AP is greater than the predetermined value A at present. If the operating amount Accp of the accelerator pedal AP is not more than the predetermined value A, the CPU 51 makes "No" determination at the step 1305 to proceed to a step 1310 where a value of a counter C is set to "0", and then, proceeds to a step 1320.

On the other hand, if the operating amount Accp of the accelerator pedal AP is greater than the predetermined value A in the judgement at the step 1305, the CPU 51 makes "Yes" determination at the step 1305, and sets a value adding "1" to the value at this time of the counter C as a new value of the counter C, and then, proceeds to a step 1320. Specifically, the value of the counter C is a value (corresponding to time) representing a period when the operating amount Accp of the accelerator pedal AP keeps greater than the predetermined value A.

The CPU 51 proceeds to the step 1320 for determining whether the value of the counter C is not less than a predetermined constant value C1 or not. If the value of the counter C is not less than the predetermined constant value C1, which means that the vehicle is in the sports running mode, the CPU 51 proceeds to a step 1325 for setting a value of a variable SPEEDsports to "4", and then, proceeds to a step 1395 to temporarily complete this routine. The variable SPEEDsports here is a value representing a mode of the connecting operation speed Vconnect selected from the viewpoint of whether the vehicle is in the sports running mode or not, and the value of "4" corresponds to the high-speed mode.

On the other hand, if the value of the counter C is less than the predetermined constant value C1 in the judgement at the step 1320, which means that the vehicle is not in the sports running mode, the CPU 51 sets at a step 1330 the variable SPEEDsports to "3", and then, proceeds to the step 1395 to temporarily complete this routine. The value of "3" corresponds here to the normal mode, like the value of "3" of the variable SPEEDmyu and the variable SPEEDstable.

Subsequently explained is the determination of starting the clutch/gear-shift control. The CPU 51 repeatedly executes the routine shown in FIG. 14 once every predetermined period. Accordingly, the CPU 51 starts the process from a step 1400 at a predetermined timing, and-then, proceeds to a step 1405 to determine whether the UP signal or DOWN signal is outputted from the shift position sensor 45 or not. If the UP signal or DOWN signal is not outputted from the shift position sensor 45, the CPU 51 immediately proceeds to a step 1495 to temporarily complete this routine.

The explanation is continued here assuming that the UP signal or DOWN signal is outputted from the shift position sensor 45 and the clutch/gear-shift control is not executed. The CPU 51 makes "Yes" determination at the step 1405, and proceeds to a step 1410 for determining whether a value of a clutch/gear-shift control now-executing flag XSHIFT is "0" or not.

At present, the clutch/gear-shift control is not executed as described above, so that the value of the clutch/gear-shift control now-executing flag XSHIFT is "0". Accordingly, the CPU 51 makes "Yes" determination at the step 1410 and proceeds to a step 1415 for storing in the variable SPEED the smaller value of the variable SPEEDmyu value at this time decided in the routine of FIG. 11 and the variable SPEEDstable value at this time decided in the routine of FIG. 12.

Figure 13:
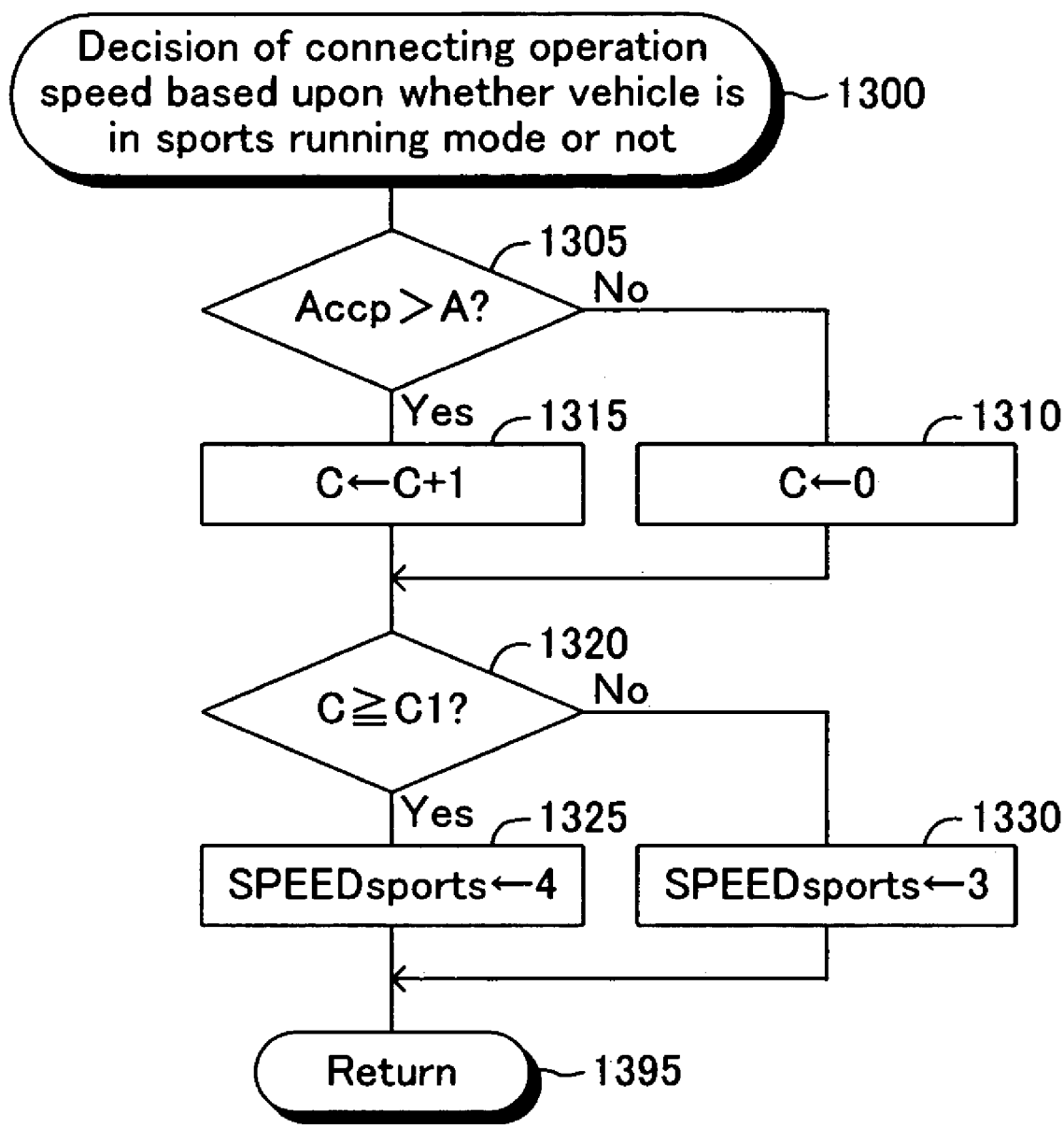
FIG. 13 is a flowchart showing a routine, executed by the CPU shown in FIG. 1, for deciding a connecting operation speed based upon whether a vehicle is in the sports running mode or not.

Then, the CPU 51 proceeds to a step 1420 for determining whether the variable SPEED value is not more than "2" or not. If the variable SPEED value is not more than "2", the CPU 51 makes "Yes" determination at the step 1420 to proceed to a step 1430. On the other hand, if the variable SPEED value is more than "2" (i.e., if it is "3") in the judgement at the step 1420, the CPU 51 makes "No" determination at the step 1420 to proceed to a step 1425 where the variable SPEEDsports value at this time decided by the routine of FIG. 13 is re-stored in the variable SPEED, and then, proceeds to a step 1430.

The variable SPEED is here a value representing a mode of the connecting operation speed Vconnect finally selected, and it is set to any one of "1" to "4" by the process at the aforesaid step 1420 or the step 1425. The values "1" to "4" respectively correspond to the low-speed mode, little low-speed mode, normal mode and high-speed mode. When the CPU 51 proceeds to the step 1430, it sets the value of the clutch/gear-shift control now-executing flag XSHIFT to "1", and then, proceeds to the step 1495 to temporarily complete this routine.

Since the value of the clutch/gear-shift control now-executing flag XSHIFT is "1" after that, the CPU 51 makes "No" determination at the step 1410 to immediately complete this routine, even if the UP signal or DOWN signal is outputted from the shift position sensor 45. Accordingly, the value of the variable SPEED is not changed during the execution of the clutch/gear-shift control (during when the value of the clutch/gear-shift control now-executing flag XSHIFT is "1"). As described above, the start of the clutch/gear-shift control is determined and the variable SPEED value that is the value representing the mode of the finally selected connecting operation speed Vconnect is decided.

Subsequently explained is the execution of the clutch/gear-shift control. The CPU 51 repeatedly executes the routine shown in FIG. 15 once every predetermined period. Accordingly, the CPU 51 starts the process from a step 1500 at a predetermined timing, and then, proceeds to a step 1502 to monitor whether the value of the clutch/gear-shift control now-executing flag XSHIFT is changed from "0" to "1".

Figure 14:
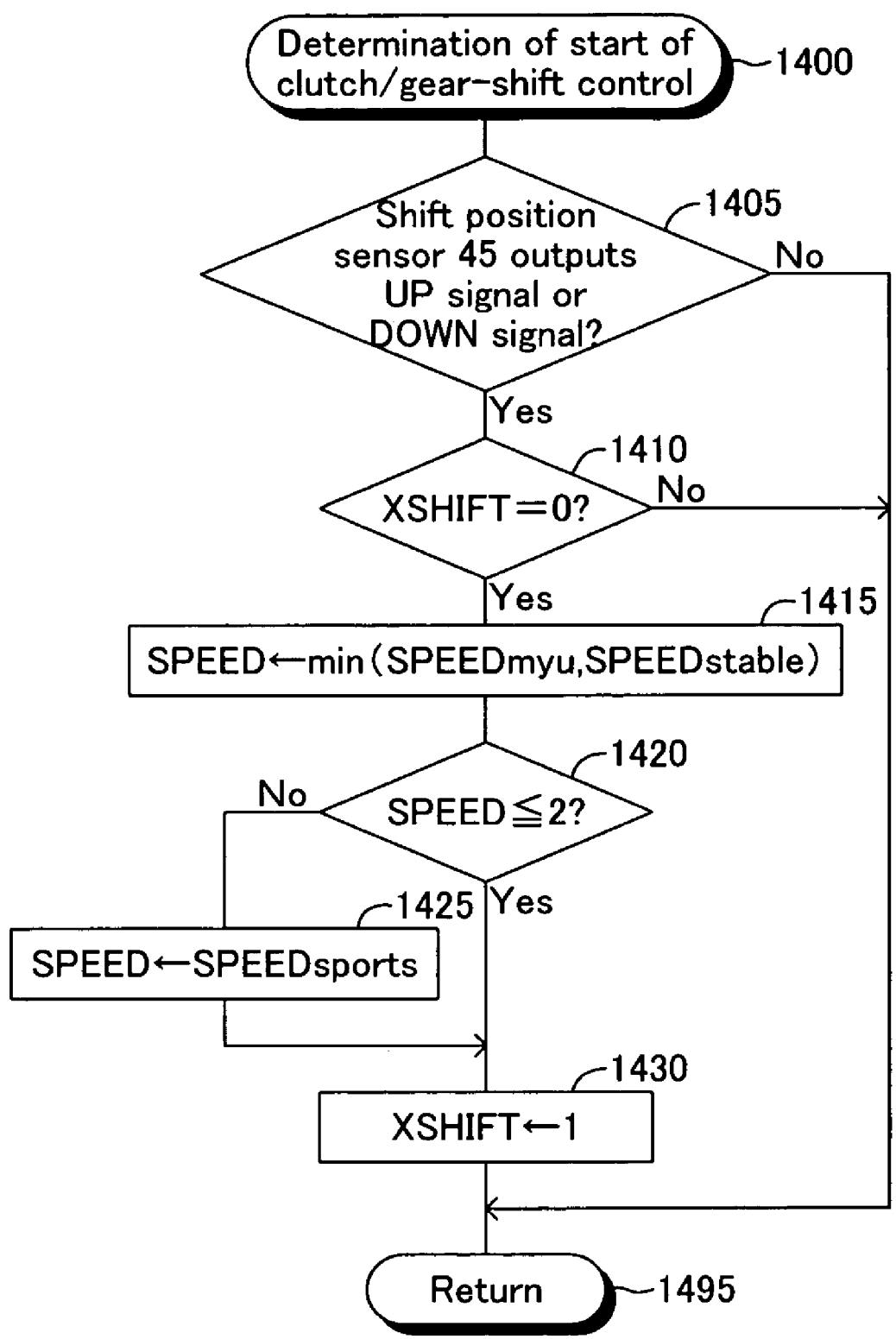
FIG. 14 is a flowchart showing a routine, executed by the CPU shown in FIG. 1, for determining a start of the clutch/gear-shift control.
Figure 15:
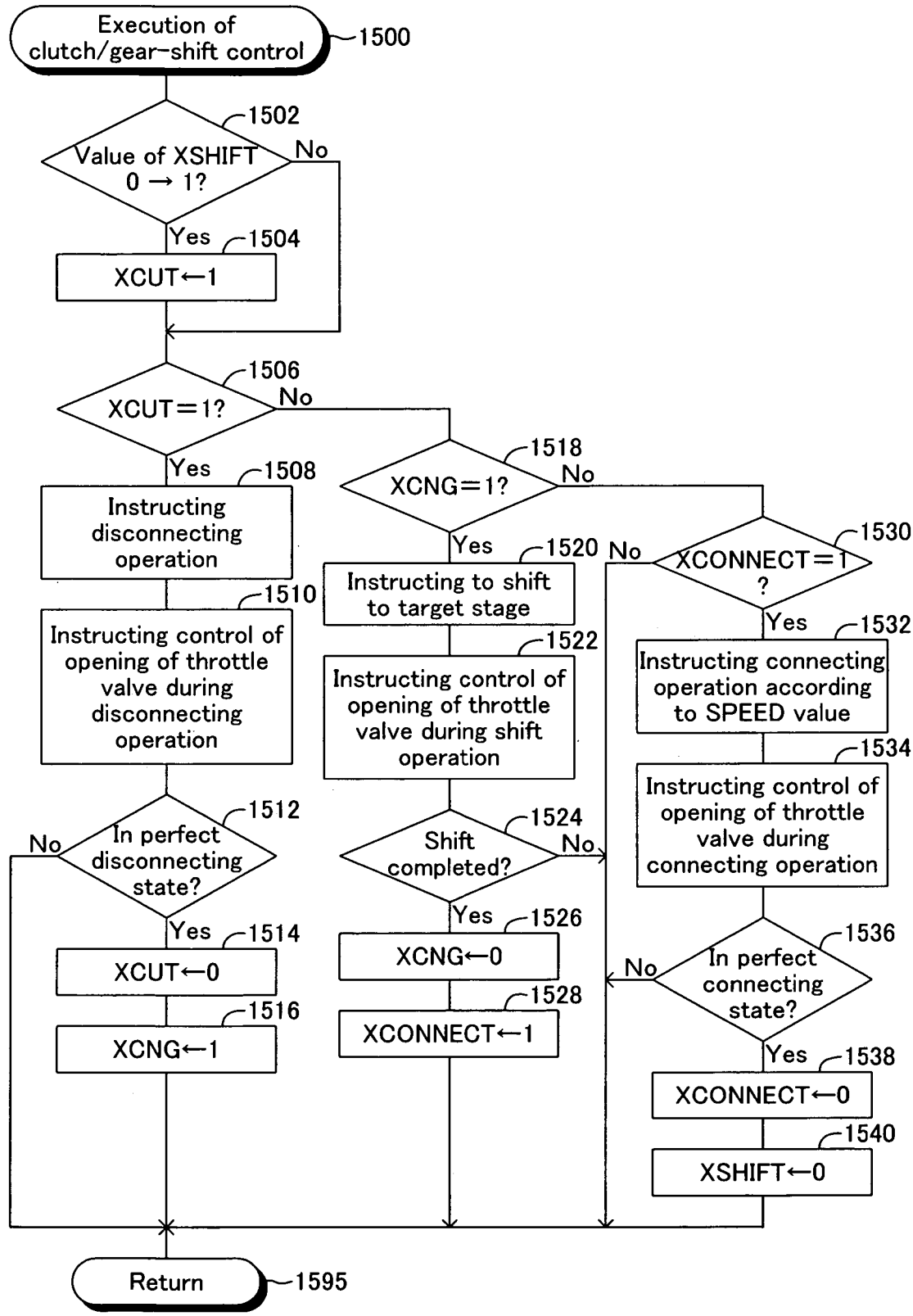
FIG. 15 is a flowchart showing a routine, executed by the CPU shown in FIG. 1, for executing the clutch/gear-shift control.

The explanation is continued here assuming that it is immediately after the value of the clutch/gear-shift control now-executing flag XSHIFT is changed from "0" to "1" by executing the process at the step 1430 of FIG. 14. The CPU 51 makes "Yes" determination at the step 1502, and proceeds to a step 1504 for setting a value of a disconnecting operation now-executing flag XCUT to "1". The disconnecting operation now-executing flag XCUT shows that the above-mentioned disconnecting operation is executed when the value thereof is "1", while shows that the disconnecting operation is not executed when the value thereof is "0".

Then, the CPU 51 proceeds to a step 1506 for determining whether the value of the disconnecting operation now-executing flag XCUT is "1" or not. Since the value of the disconnecting operation now-executing flag XCUT is "1" at present, the CPU 51 makes "Yes" determination at the step 1506 to proceed to a step 1508 where it gives to the clutch connecting/disconnecting actuator 24a an instruction to perform the disconnecting operation. Specifically, the CPU 51 gives an instruction for controlling the driving force of the clutch connecting/disconnecting actuator 24a such that the press-contact force F on the frictional face of the clutch disc of the clutch 24 is decreased from the value at that time (the maximum value F1 at present) with the disconnecting operation speed Vcut calculated from the formula 1.

Subsequently, the CPU 51 proceeds to a step 1510 for giving to the throttle valve actuator 22 the instruction of the above-mentioned "control of the opening of the throttle valve during the disconnecting operation". Then, the CPU 51 proceeds to a step 1512 for determining whether the clutch 24 is in the perfect disconnecting state or riot. Specifically, the CPU 51 determines whether the clutch connecting/disconnecting actuator 24a outputs the signal showing that the clutch 24 is in the perfect disconnecting state. It is immediately after the disconnecting operation is started at present, so that the CPU 51 proceeds to the step 1512 for making "No" determination, and then, immediately proceeds to a step 1595 to temporarily complete this routine.

After that, a series of processes at step 1500, step 1502 (making "No" determination), steps 1506 (making "Yes" determination) to 1512 (making "No" determination) and step 1595 are repeatedly executed until the clutch 24 becomes the perfect disconnecting state (until the disconnecting operation is finished) due to the advance of the disconnecting operation of the clutch 24. When the clutch 24 becomes the perfect disconnecting state, the CPU 51 makes "Yes" determination at the step 1512 to proceed to a step 1514 where the value of the disconnecting operation now-executing flag XCUT is set to "0". Then, the CPU 51 sets a value of a shift operation now-executing flag XCNG to "1" at a following step 1516, and then, proceeds to the step 1595 to temporarily complete this routine. The shift operation now-executing flag XCNG shows that the above-mentioned gear-shift operation is executed when the value thereof is "1", while shows that the gear-shift operation is not executed when the value thereof is "0".

Then, the CPU 51 makes "No" determination at the step 1502 and step 1506, and then, proceeds to a step 1518 for determining whether the value of the shift operation now-executing flag XCNG is "1" or not. Since the value of the shift operation now-executing flag XCNG is "1" at present due to the process at the step 1516, the CPU 51 makes "Yes" determination at the step 1518 to proceed to a step 1520 where it gives an instruction to the gear-shift actuator 25a for shifting the stage of the transmission 25 to the target stage.

Subsequently, the CPU 51 proceeds to a step 1522 for giving to the throttle valve actuator 22 an instruction of the above-mentioned "control of the opening of the throttle valve during the shift operation". Then, the CPU 51 proceeds to a step 1524 for determining whether the gear-shift operation to the target stage is completed or not. Specifically, the CPU 51 determines whether the gear-shift actuator 25a outputs the signal showing that the gear-shift operation is completed. It is immediately after the gear-shift operation by the gear-shift actuator 25a is started at present, so that the CPU 51 proceeds to a step 1524 for making "No" determination, and then, immediately proceeds to the step 1595 to temporarily complete this routine.

After that, a series of processes at step 1500, step 1502 (making "No" determination), step 1506 (making "No" determination), steps 1518 (making "Yes" determination) to 1524 (making "No" determination) and step 1595 are repeatedly executed until the gear-shift operation is completed. When the gear-shift operation is completed, the CPU 51 makes "Yes" determination at a step 1524 to proceed to a step 1526 where the value of the shift operation now-executing flag XCNG is set to "0". Then, the CPU 51 sets a value of a connecting operation now-executing flag XCONNECT to "1" at a following step 1528, and then, proceeds to the step 1595 to temporarily complete this routine. The connecting operation now-executing flag XCONNECT shows that the above-mentioned connecting operation is executed when the value thereof is "1", while shows that the connecting operation is not executed when the value thereof is "0".

Then, the CPU 51 makes "No" determination at steps 1502, 1506 and 1518, and then, proceeds to a step 1530 for determining whether the value of the connecting operation now-executing flag XCONNECT is "1" or not. Since the value of the connecting operation now-executing flag XCONNECT is "1" at present due to the process at the step 1528, the CPU 51 makes "Yes" determination at the step 1530 to proceed to a step 1532 where it gives to the clutch connecting/disconnecting actuator 24a an instruction to perform the connecting operation. Specifically, the CPU 51 gives an instruction for controlling the driving force of the clutch connecting/disconnecting actuator 24a such that the press-contact force F on the frictional face of the clutch disc of the clutch 24 is increased from the value at that time ("0" at present) with the connecting operation speed Vconnect calculated at the routine of FIG. 14 and according to the value of the varialbe SPEED.

Subsequently, the CPU 51 proceeds to a step 1534 for giving to the throttle valve actuator 22 an instruction of the above-mentioned "control of the opening of the throttle valve during the connecting operation". Then, the CPU 51 proceeds to a step 1536 for determining whether the clutch 24 is in the perfect connecting state. Specifically, the CPU 51 determines whether the clutch connecting/disconnecting actuator 24a outputs the signal showing that the clutch 24 is in the perfect connecting state. It is immediately after the connecting operation is started at present, so that the CPU 51 proceeds to a step 1536 for making "No" determination, and then, immediately proceeds to the step 1595 to temporarily complete this routine.

After that, a series of processes at step 1500, step 1502 (making "No" determination), step 1506 (making "No" determination), step 1518 (making "No" determination), steps 1530 (making "Yes" determination) to 1536 (making "No" determination) and step 1595 are repeatedly executed until the clutch 24 is in the perfect connecting state due to the advance of the connecting operation of the clutch 24. When the clutch 24 is in the perfect connecting state, the CPU 51 makes "Yes" determination at the step 1536 to proceed to the step 1538 where the value of the connecting operation now-executing flag XCONNECT is set to "0". Then, the CPU 51 sets a value of the clutch/gear-shift operation now-executing flag XSHIFT to "0" at a following step 1540, and then, proceeds to the step 1595 to temporarily complete this routine. By this process, the clutch/gear-shift control is completed.

After that, the CPU 51 makes "No" determination at all the steps of 1502, 1506, 1518 and 1530 until the value of the clutch/gear-shift control now-executing flag XSHIFT is set again to "1" (until the driver moves the shift lever SL to the UP position or DOWN position). Then, the CPU 51 immediately proceeds to the step 1595 to temporarily complete this routine.

As explained above, the automatic clutch control device according to the present invention changes the connecting operation speed Vconnect of the clutch 24 according to the road friction coefficient μ at the time (disconnecting operation starting point) when the clutch connecting/disconnecting control is started, wherein the connecting operation speed Vconnect is set to become slow as the road friction coefficient μ is smaller. As a result, when the road friction coefficient μ is great, the period when the clutch 24 is in the disconnecting state (the period from the disconnecting operation starting point to the connecting operation completing point) is shortened, while when the road friction coefficient μ is small, the driving wheels RL and RR are hardly slipped (in the accelerating direction). Consequently, the vehicle stability is satisfactorily maintained regardless of the magnitude of the road friction coefficient μ.

Further, the connecting operation speed Vconnect is changed according to whether the vehicle stabilizing control such as the traction control or the like is executed or not at the time when the clutch connecting/disconnecting control is started. When the vehicle stabilizing control is executed, the connecting operation speed Vconnect is set so as to become slow compared to the case where the vehicle stabilizing control is not executed. As a result, even if the clutch/gear-shift control is performed during when the vehicle stabilizing control is executed, the change of the driving torque T of the driving wheels RL and RR generated by this control does not become a great disturbance to the vehicle stabilizing control, whereby the vehicle stabilizing control is precisely performed and the vehicle stability is satisfactorily maintained.

Moreover, in case where the driver continuously performs the operation (predetermined operation) of the accelerator pedal AP such that the operating amount Accp of the accelerator pedal becomes greater than the predetermined value A over a predetermined time, the vehicle is determined to be in the sports running mode. When the vehicle is in the sports running mode at the time when the clutch connecting/disconnecting operation is started, the connecting operation speed Vconnect is set so as to become slow compared to the case where the vehicle is not in the sports running mode. As a result, the period when the clutch 24 is in the disconnecting state (the period from the disconnecting operations starting point to the connecting operation completing point) is shortened, so that the vehicle is returned again to the accelerating state from the earlier stage. Accordingly, the control that meets the driver's demand can be executed.

The present invention is not limited to the above-mentioned embodiments, but various modifications can be applied within the scope of the invention. For example, the transmission 25 is a manual transmission in which the shift operation is performed by the operation of the shift lever by the driver in the aforesaid embodiment, but an automatic transmission can be applied in which the shift operation is automatically performed according to the running state of the vehicle not by the shift lever operation by the driver.

Moreover, only the connecting operation speed Vconnect of the clutch 24 is changed according to the running state of the vehicle in the aforesaid embodiment, but only the disconnecting operation speed Vcut of the clutch, or the disconnecting operation speed Vcut and the connecting operation speed Vconnect may be changed according to the running state of the vehicle (for example, the value of the road friction coefficient μ, whether the vehicle stabilizing control is executed or not, whether the vehicle is in the sports running mode or not).

Further, although the above-mentioned embodiment sets the connecting operation speed Vconnect of the clutch 24 to a speed corresponding to any one of four modes according to the running state of the vehicle, the connecting operation speed Vconnect (and/or the disconnecting operation speed Vcut) of the clutch 24 may be changed steplessly according to the running state of the vehicle.

Additionally, the above-mentioned embodiment determines that the vehicle is in the sports running mode when the continuously executed operation is such that the operating amount Accp of the accelerator pedal AP becomes greater than the predetermined value A over a predetermined time, but in case where the vehicle is provided with selecting means (e.g., sports running selection switch) for selecting a normal running mode and a sports running mode in which the timing of the shift-up of the gear in the transmission is shifted to the high-rotation side so as to obtain an acceleration greater than that of the normal running mode, the vehicle may be determined to be in the sports running mode when the operation for selecting the sports running mode by the selecting means is executed.

Further, although the electrical control apparatus 50 (CPU 51) performs the above-mentioned all calculations, determinations, directions or the like in the aforesaid embodiment, an electrical control apparatus exclusively used for controlling the clutch connecting/disconnecting actuator 24a so as to be driven is provided, independent of the electrical control apparatus 50, and this exclusive electrical control apparatus may receive an indication signal relating to the disconnecting speed and/or connecting speed of the clutch 24 outputted from the electrical control apparatus 50 and may control the clutch connecting/disconnecting actuator 24a so as to be driven according to this indication signal.

What is claimed is:
1. An automatic clutch control device comprising:
a clutch connecting/disconnecting actuator for driving a clutch disposed between an output shaft of a power source of a vehicle and an input shaft of a transmission, so as to be connected or disconnected; and
a clutch control means for executing:

a disconnecting operation for changing a state of the clutch from a connecting state to a disconnecting state before the transmission starts a shift operation, and a connecting operation for changing the state of the clutch from the disconnecting state to the connecting state after the shift operation is completed, wherein the clutch control means is operable for changing, in accordance with a running state of the vehicle, at least one of:

a speed of the connecting operation defined as extending from a beginning of the connecting operation to an end of the connecting operation, and a speed of the disconnecting operation defined as extending from a beginning of the disconnecting operation to an end of the disconnecting operation.

2. An automatic clutch control device claimed in claim 1, comprising road friction coefficient obtaining means for obtaining a road friction coefficient that is a friction coefficient between a road surface on which the vehicle runs and a tire of the vehicle, wherein the clutch control means is configured to change at least one of the connecting operation speed and the disconnecting operation speed in accordance with the road friction coefficient.

3. An automatic clutch control device claimed in claim 2 wherein the clutch control means is configured to slow at least one of the connecting operation speed and the disconnecting operation speed as the road friction coefficient is smaller.

4. An automatic clutch control device claimed in claim 3, wherein the clutch control means is configured to slow only the connecting operation speed as the road friction coefficient is smaller.

5. An automatic clutch control device claimed in claim 1, wherein the vehicle, to which the automatic clutch control device is applied, comprises vehicle stabilizing control executing means for setting a target wheel speed related amount of each wheel in accordance with a running state of the vehicle and controlling braking force exerted on each wheel such that an actual wheel speed related amount of each wheel becomes the target wheel speed related amount, and the clutch control means is configured to change at least one of the connecting operation speed and the disconnecting operation speed depending upon whether the vehicle stabilizing control is executed or not.

6. An automatic clutch control device claimed in claim 5, wherein the clutch control means is configured to slow at least one of the connecting operation speed and the disconnecting operation speed when the vehicle stabilizing control is executed, compared to the case where the vehicle stabilizing control is not executed.

7. An automatic clutch control device claimed in claim 6, wherein the clutch control means is configured to slow only the connecting operation speed when the vehicle stabilizing control is executed, compared to the case where the vehicle stabilizing control is not executed.

8. An automatic clutch control device claimed in claim 1, comprising determining means that determines whether a predetermined operation for obtaining an acceleration greater than an acceleration obtained when the vehicle is in the normal running state is executed or not by a driver, wherein the clutch control means is configured to change at least one of the connecting operation speed and the disconnecting operation speed depending upon whether the predetermined operation is executed or not.

9. An automatic clutch control device claimed in claim 8, wherein the clutch control means is configured to increase at least one of the connecting operation speed and the disconnecting operation speed when the predetermined operation is executed, compared to the case where the predetermined operation is not executed.

10. An automatic clutch control device claimed in claim 9, wherein the clutch control means is configured to increase only the connecting operation speed when the predetermined operation is executed, compared to the case where the predetermined operation is not executed.

11. An automatic clutch control device claimed in claim 1 wherein the clutch is connected directly between the output shaft of the vehicle's power source and the input shaft of the transmission.

* * * * *